United States Patent
Mizutani et al.

(10) Patent No.: US 6,483,611 B1
(45) Date of Patent: Nov. 19, 2002

(54) HOLOGRAM AND PROCESS FOR PRODUCING HOLOGRAM

(75) Inventors: Yasuhiro Mizutani, Inabe-gun (JP); Hidekazu Hattori, Nagoya (JP); Satoru Kadowaki, Mie-gun (JP); Kazutaka Suzuki, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/564,856

(22) Filed: May 4, 2000

Related U.S. Application Data

(62) Division of application No. 09/321,876, filed on May 28, 1999, now Pat. No. 6,141,123.

(30) Foreign Application Priority Data

| May 29, 1998 | (JP) | 10-149321 |
| Jun. 18, 1998 | (JP) | 10-171465 |
| Jul. 9, 1998 | (JP) | 10-194087 |
| Apr. 19, 1999 | (JP) | 11-110608 |

(51) Int. Cl.$^7$ ............................... G03H 1/02
(52) U.S. Cl. ............................ 359/3; 359/15
(58) Field of Search ........................ 359/3, 15

(56) References Cited

U.S. PATENT DOCUMENTS

| 4,329,409 A | 5/1982 | Wreede et al. |
| 5,683,774 A | 11/1997 | Faykish et al. |
| 5,755,919 A | 5/1998 | Ueda et al. |
| 5,798,850 A | 8/1998 | Ishikawa et al. |
| 6,066,378 A | * 5/2000 | Morii et al. ............... 359/1 |
| 6,322,932 B1 | * 11/2001 | Colvin et al. ............... 430/2 |

FOREIGN PATENT DOCUMENTS

| EP | 0 291 928 | 11/1988 |
| EP | 0 353 603 | 2/1990 |
| EP | 0 487 086 | 5/1992 |
| EP | 0 509 512 | 10/1992 |
| EP | 0 753 801 | 1/1997 |
| JP | 3-157684 | 7/1991 |
| JP | 6-56484 | 3/1994 |
| JP | 9-90857 | 4/1997 |
| WO | WO98/12607 | * 3/1998 |

* cited by examiner

*Primary Examiner*—Casandra Spyrou
*Assistant Examiner*—Alessandro V. Amari
(74) *Attorney, Agent, or Firm*—Harness, Dickey & Pierce, PLC

(57) ABSTRACT

There is provided a hologram with excellent heat resistance. The hologram comprises a hologram film (10) in which a diffraction grating has been recorder, a substrated (11) situated on one side of the hologram film (10) via a bonding material (13), and a polymer film (12) situated on the other side of the hologram film (10) via a bonding material (13), wherein the thickness of the polymer film (12) is no greater than 100 $\mu$m. Otherwise, the polymer film (12) is subjected to prior heat treatment.

There is further provided a production process for holograms with minimal appearance defects. The process comprises preparing a photopolymer (210) coated onto a substrate (211) and affixing the photopolymer surface (301) onto a photographed object original (213), exposing it to laser light to converting it into a hologram (201), then releasing the hologram (201) from the photographed object original (213) to expose the hologram surface (302) and finally affixing a protective film (215) onto the hologram surface (302), such that the bonding strength A between the substrate (211) and the hologram (201) is greater than the bonding strenght B between the hologram (201) and the protective film (215).

20 Claims, 19 Drawing Sheets

Fig. 6
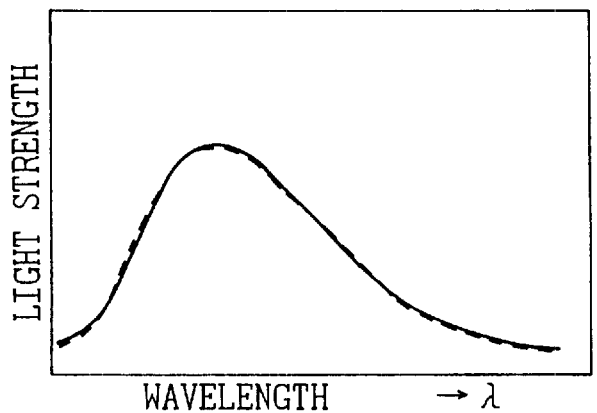
(A)
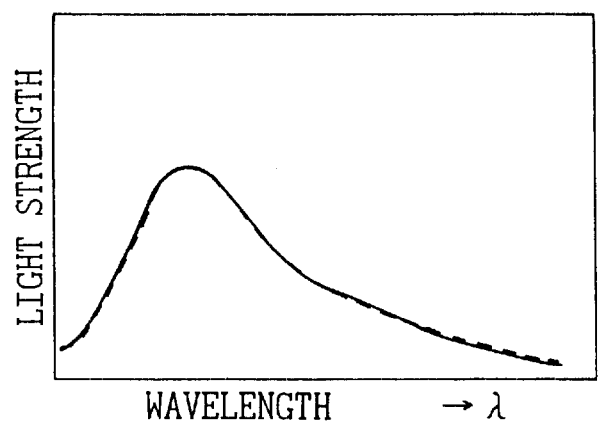
(B)
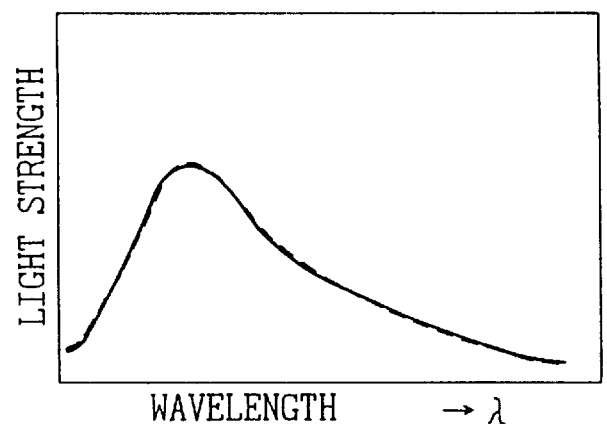
(C)

Fig.7
(A) 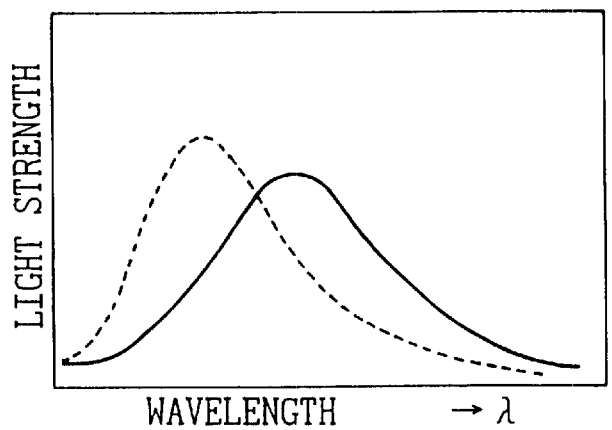
(B) 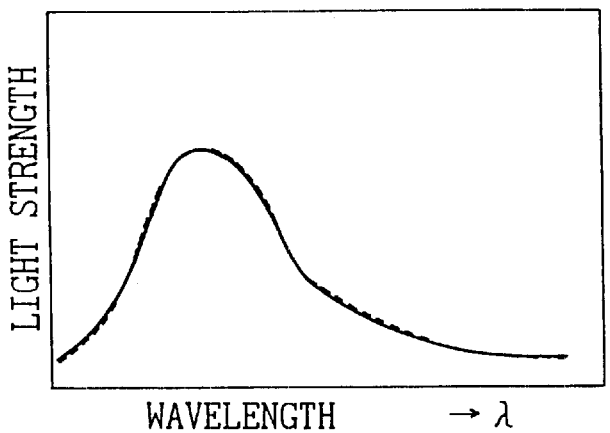
(C) 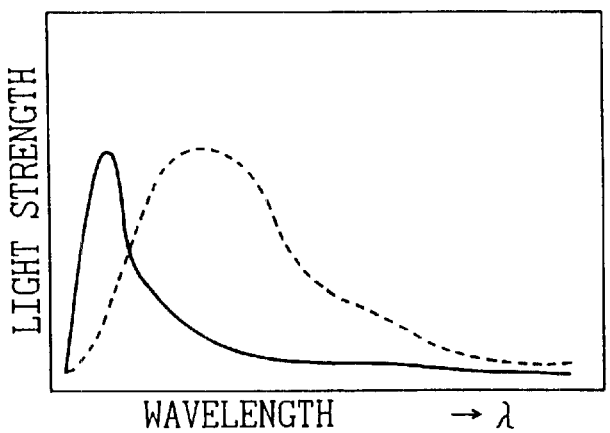

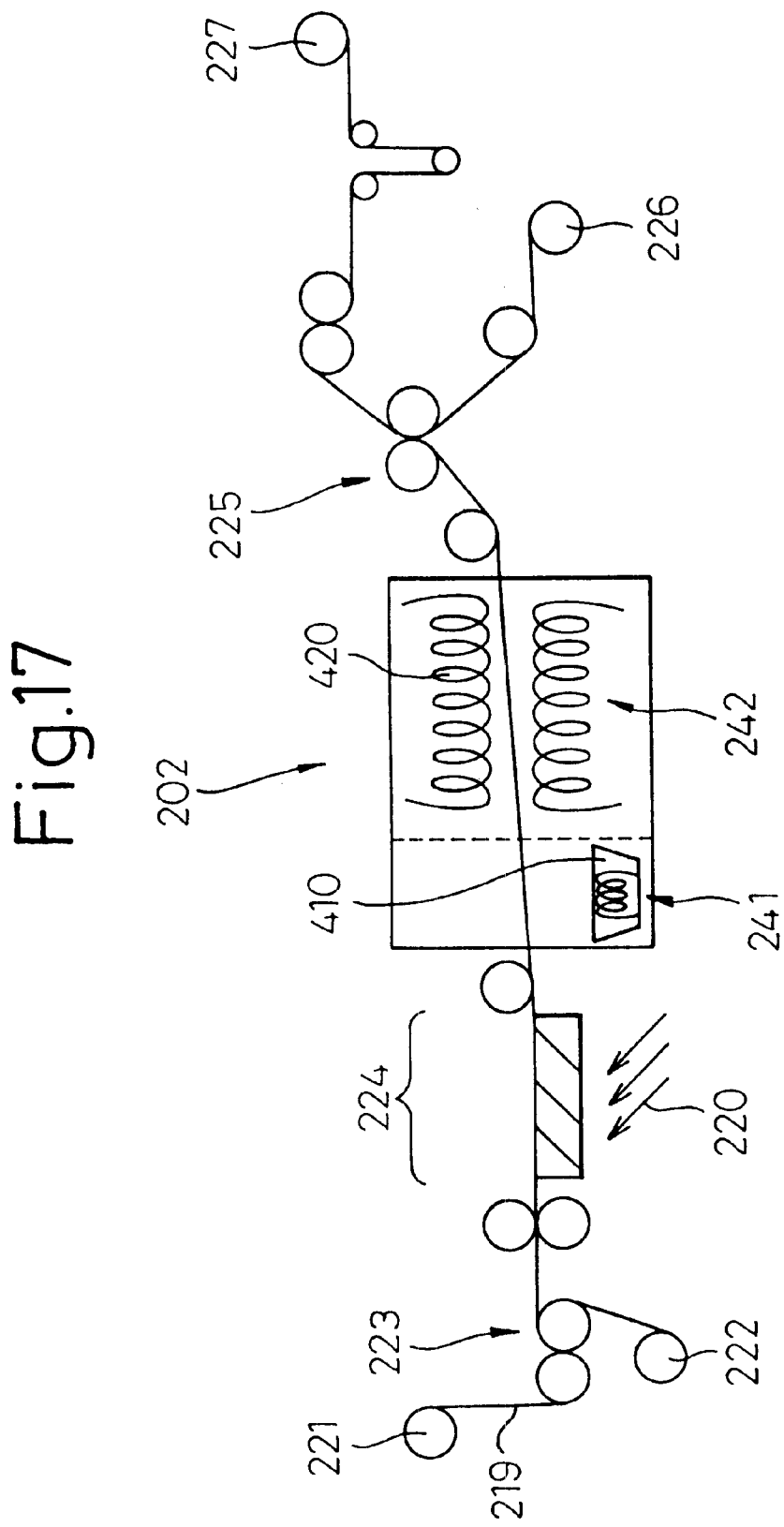

Fig.19
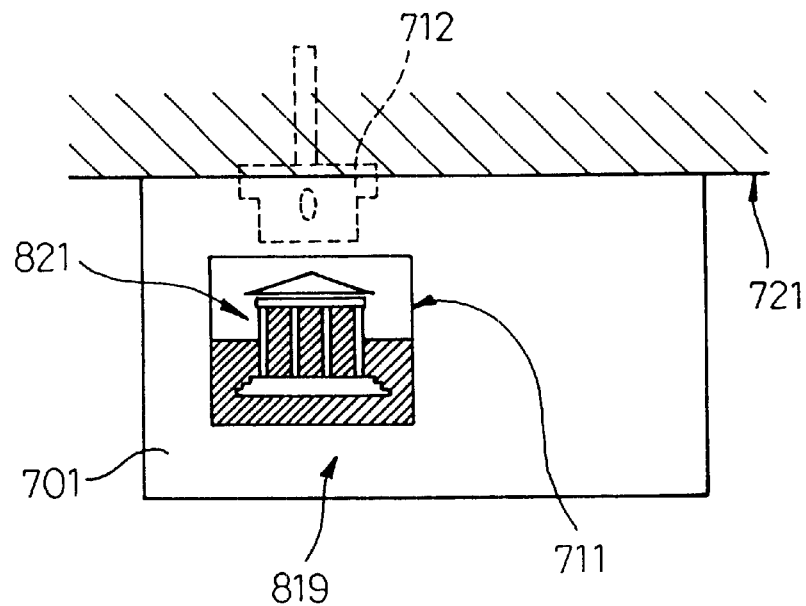
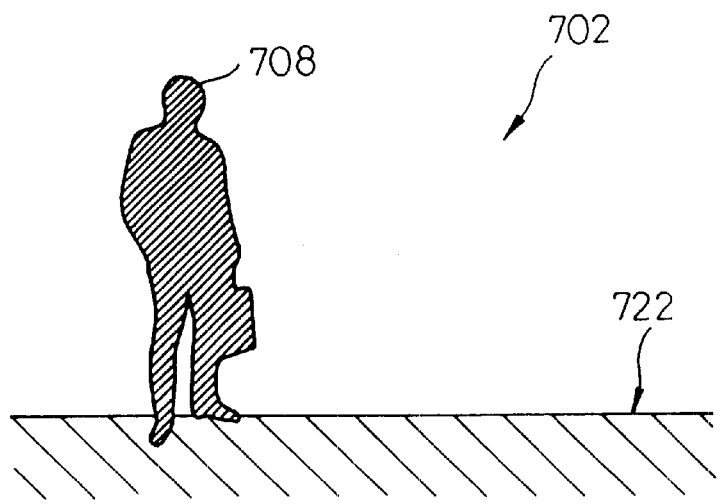

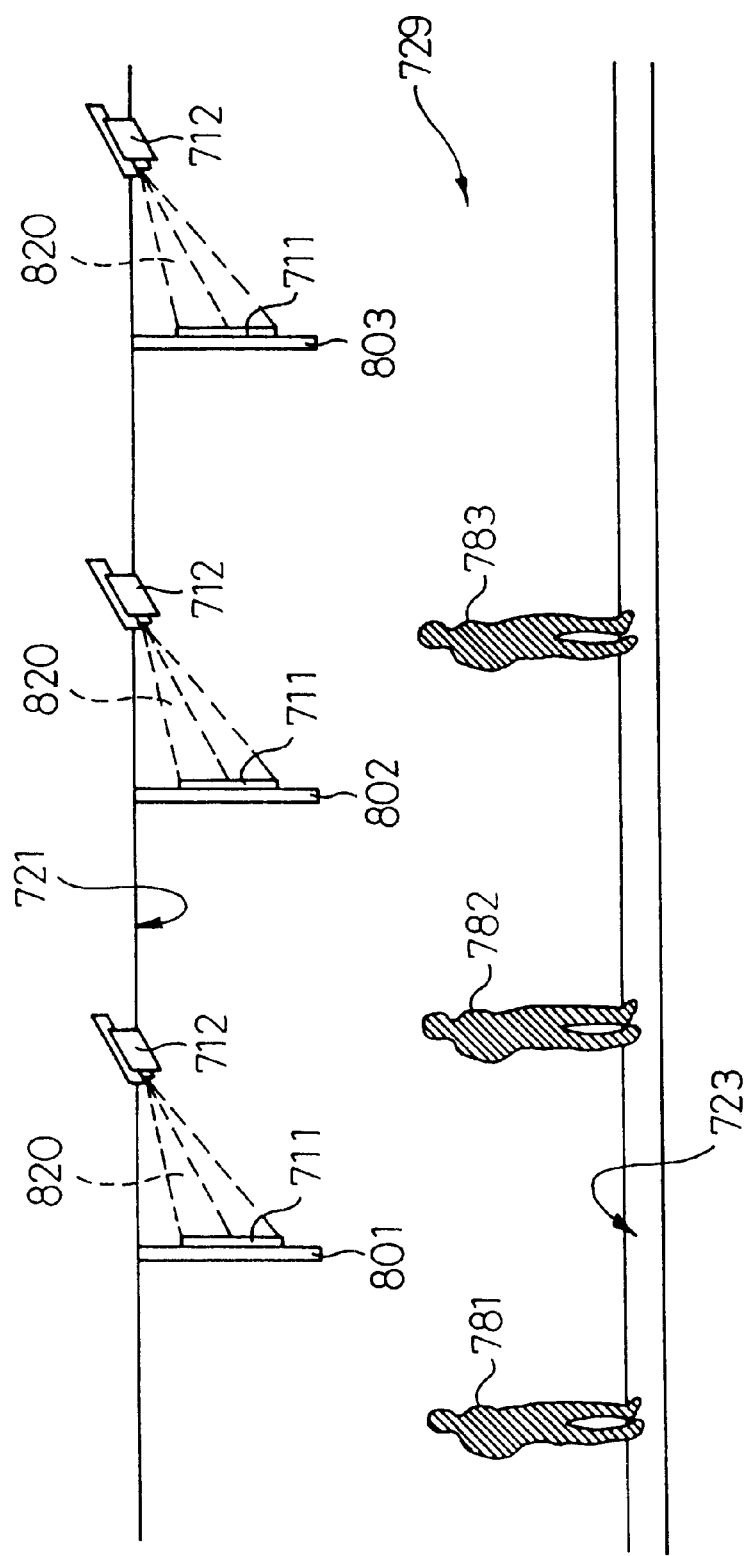

HOLOGRAM AND PROCESS FOR PRODUCING HOLOGRAM

This is a division of Ser. No. 09/321,876 filed May 28, 1999 now U.S. Pat. No. 6,141,123.

BACKGROUND OF THE INVENTION

1. Field of the Invention

The present invention relates to a hologram, comprising a hologram film in which a diffraction grating has been recorded, that can be used as a screen, an optical reflection element or the like, and to a hologram production process for continuous production of holograms which are copies of the same photographed object original.

2. Description of the Related Art

Hologram films made of photopolymers and gelatin dichromate are well known in the prior art as hologram optical elements (HOES) employing volume phase-type holograms.

When such hologram films are used for various hologram optical elements, increased nick resistance, moisture resistance and solvent resistance of the hologram films are often provided by joining the hologram film to a protective material such as a substrate made of glass or a polymer film via a bonding material, leaving the hologram film in a sealed state.

In cases where the hologram film is made of gelatin dichromate, it has been proposed to use epoxy-based adhesives with excellent moisture resistance as the bonding material. For hologram films made of photopolymers, bonding materials proposed for use have included an adhesive containing no plasticizer to prevent migration of the solvent from the polymer film, etc. (Japanese Unexamined Patent Publication (Kokai) No. 6-56484) and an adhesive comprising a polyfunctional acrylate and a polymerization initiator (Japanese Unexamined Patent Publication (Kokai) No. 3-157684).

The following are well-known examples of applications wherein various hologram optical elements are used as display apparatuses.

As a first example there may be mentioned a hologram screen wherein a hologram film bearing a recorded light diffuser is used as a screen.

As shown in the attached FIG. 2, the hologram film can be fabricated by irradiating a photopolymer, gelatin dichromate or the like with an object beam composed of scattered light created by passing light through a light diffuser, and a reference beam consisting of non-scattered light, and recording an interference pattern functioning as a diffraction grating, which is produced by the object beam and the scattered light on the photopolymer, gelatin dichromate, etc.

The hologram film is reinforced with a protective material or bonding material as described above to construct a hologram screen. In the hologram screen, irradiation of an irradiated beam containing image data onto the screen can display an image because of diffraction and scattering of the irradiated beam on the screen.

As a second example there may be mentioned a reflection-type hologram reflector element which employs a hologram film on which a recorded plane mirror, concave mirror, convex mirror, etc. has been recorded, and which functions as a mirror.

This hologram film can be fabricated by irradiating onto a photosensitive material an object beam obtained by reflection at a concave mirror or convex mirror and a reference beam consisting of non-reflected light.

This type of hologram film is reinforced by a protective material or bonding material as described above to construct a hologram screen or hologram reflector element.

In this hologram reflector element, reflection of an irradiated beam containing image data can display a virtual image behind the hologram reflector element. A lens function may also be provided to allow magnification or reduction of the virtual image depending on the type of concave mirror or convex mirror.

The holograms described above, however, are prone to heat shrinkage of the polymer films when the use environment is under a high temperature. In such cases, since the substrate of glass, etc. undergoes virtually no heat shrinkage, stress is created between the substrate of glass, etc. and the polymer film, and this stress causes a deformation of the hologram film that can alter the gradient of the interference pattern in the hologram film.

Interference patterns with various gradients are recorded in hologram films, and light irradiated onto the holograms is diffracted because these interference patterns function as diffraction gratings. The interference patterns become inclined in response to any deformation of the hologram films, and their directions are thus altered.

When light is irradiated onto a hologram film, the light is diffracted due to the interference pattern; however, even if it is diffracted by the same interference pattern before and after deformation of the hologram film, it is diffracted in a different direction after deformation than before deformation because the gradient of the interference pattern is altered. Consequently, as shown in the attached FIG. 7, a phenomenon occurs whereby the peak of the hologram spectral characteristics is shifted toward the long wavelength end or short wavelength end after heat shrinkage occurs.

A screen or reflector element made of the hologram described above utilizes a diffraction effect due to the interference pattern in the hologram film, and therefore when deformation of the hologram film occurs due to heat shrinkage of the polymer film, a problem occurs in that a hue difference is produced between the irradiated beam which is irradiated and the image obtained by diffraction or reflection, or the hue is different between the outer perimeter and inside of the hologram, making the image appear deformed.

Naturally, this problem does not occur if the protective material encapsulating the hologram film is composed entirely of the same material or of a substance with the same degree of heat shrinkage, but this is not practical either because of the following problems.

One of these problems is that when the hologram is a film, the hologram twists, altering the hue of the image and producing deformation of the image. It is therefore necessary to support the hologram film with a substrate. The production process becomes more complicated with a structure wherein the hologram film is sandwiched between substrates.

As a practical operating method, when the hologram screen is placed onto window glass or the like, the semi-completed product comprising the hologram film, polymer film and bonding material is affixed onto the window glass. It is not practically possible to affix the hologram film bonded to the substrate onto another window glass or the like without including air bubbles, etc. When air bubbles have been included, the air bubbles are seen over the image, making it difficult to view the image.

Moreover, when the hologram is used as a reflector element and a plane mirror has been recorded on the hologram film, a lens effect (concave mirror/convex mirror effect) is produced which magnifies or reduces the reflected virtual image of the hologram, or when a concave mirror or convex mirror has been recorded it has often been impossible to obtain the designed lens effect (see Embodiment 3 below).

These problems occur most notably around the perimeter of the hologram where stress readily accumulates (see Embodiments 2 and 3 below).

In light of these problems of the prior art, it is an object of the present invention to provide a hologram with excellent heat resistance.

The present invention also relates to a hologram production process for continuous production of holograms which are copies of the same photographed object original.

A conventional process for continuous production of the same hologram is known whereby a photographed object original is continuously copied onto a film-like, long photopolymer (Japanese Unexamined Patent Publication (Kokai) No. 9-90857).

As shown in FIG. 13 explained below, after the film-like photopolymer is fed to a supply roller and the photopolymer is affixed to the photographed object original, it is exposed to laser light to copy the photographed object original onto the photopolymer. This converts the photopolymer to a hologram.

The hologram is then released from the photographed object original and affixed onto a protective film to protect the soft, easily damaged hologram. It is then wound up on a winding roller and the hologram is stored in a wound state.

This allows continuous production of holograms which are copies of the same photographed object original. The holograms obtained by this process are also long, and are therefore used after appropriate cutting.

By the conventional process described above, however, there is a risk of uneven attachment of the protective film onto the hologram due to slight vibrations, etc. of the protective film, and this has resulted in possible string-like appearance defects in the hologram. Emboss-like appearance defects have also been a risk, because irregularities in the attachment roller are transferred to the soft hologram.

As a more detailed explanation, while an appropriate pressing force is applied when affixing the protective film to the hologram, the pressing force sometimes exceeds the appropriate pressing force because of variation due to vibrations when the protective film moves, irregularities in the roller, etc.

In such cases, deformations 351, 301 are produced in the protective film 215 and hologram 201, as shown in FIG. 16B explained below. Since the hologram 201 is soft the deformations 301 sometimes disappear by the elasticity of the hologram 201 itself, but in most cases deformations are almost never eliminated from the hologram 201 once it has been deformed, because the protective film 215 acts to secure the deformations in the hologram 201.

When a hologram screen is constructed with a hologram in which such deformation has occurred, and an image beam 320 is irradiated onto the hologram screen by a projector 232 as shown in FIG. 14 explained below, there has been a risk of string-like blemishes 291, emboss-like blemishes 292 and the like being reflected on the hologram screen 209 as shown in FIG. 15B, which can be clearly seen by the viewer 238. These blemishes 291, 292 overlap the image 310, and thus risk noticeably impairing the appearance of the image 310.

In light of these problems of the prior art, it is another object of the invention to provide a process for producing holograms which can prevent occurrence of appearance defects.

SUMMARY OF THE INVENTION

The first aspect of the invention is a hologram comprising a hologram film in which a diffraction grating has been recorded, a substrate situated on one side of the hologram film via a bonding material, and a polymer film situated on the other side of the hologram film via a bonding material, characterized in that the thickness of the polymer film is no greater than 100 μm.

The most notable feature of this aspect is that the thickness of the polymer film is no greater than 100 μm.

The polymer film undergoes heat shrinkage when the environment in which the hologram is used is under high temperature, but the substrate undergoes virtually no heat shrinkage. The hologram film is deformed by motion stress during heat shrinkage of the polymer film, but if the thickness of the polymer film is limited to no greater than 100 μm as according to this aspect, it is possible to sufficiently reduce the stress acting on the hologram film.

It is thus possible to obtain a hologram in which deformation of the hologram film is minimized as is deformation of the interference pattern functioning as the diffraction grating recorded in the hologram film, which is a cause of deformation of the hologram film, while variation in the spectral characteristics and diffraction angle of the irradiated beam, for example, are also minimized (see Embodiments 2 and 3 below).

According to this aspect, holograms with excellent heat resistance can be provided.

If the thickness of the polymer film exceeds 100 μm there will be greater contraction force due to heat shrinkage of the polymer film, thus risking deformation of the hologram film and alteration of the hue and shape of the image. The contraction force is directly proportional to the thickness of the polymer film.

The lower limit for the thickness of the polymer film is preferably 25 μm, in order to guarantee damage resistance and ease of fabrication during production.

The polymer film used may be polyethylene terephthalate (PET), polycarbonate (PC), triacetyl cellulose (TAC) or the like. The substrate used may be a glass substrate, acrylic substrate, polycarbonate substrate or the like.

The surface side of the polymer film (the side exposed to the outside) may be supplied with a hard coat film for improved damage resistance or with an anti-reflection film or anti-glare film to reduce surface reflection.

A coloring agent may be combined with the polymer film itself for coloration of the hologram itself, or a colored polymer film designed to attract attention may be used. The effect of the coloring to attract attention is particularly effective in the case of a hologram screen.

The bonding material used may be a tackifier, hot-melt agent, adhesive or the like.

The polymer film used can also be an adhesive film wherein the polymer film and bonding material are integrated.

The second aspect of the invention is a hologram comprising a hologram film in which a diffraction grating has been recorded, a first polymer film situated on one side of the hologram film via a bonding material, a substrate situated via a bonding material on the side of the first polymer film on which the hologram film is not situated, and a second polymer film situated on the other side of the hologram film via a bonding material, characterized in that the thickness of the first polymer film is no greater than 150 μm.

By limiting the thickness of the first polymer film to no greater than 150 μm it is possible to sufficiently reduce stress acting on the hologram film and thus minimize deformation of the hologram film, similar to the first aspect.

It is thereby possible to obtain a hologram in which deformation of the interference pattern functioning as the diffraction grating, which causes deformation of the hologram film, is minimized, and changes in the spectral characteristics, etc. by heat are minimized.

According to the second aspect there may be provided holograms with excellent heat resistance.

If the thickness of the first polymer film exceeds 150 μm the contraction force due to heat shrinkage of the polymer film will be greater, thus risking deformation of the hologram film and alteration of the hue and shape of the image.

The lower limit for the thickness of the polymer film is preferably 25 μm from the standpoint of easier fabrication during production, but the first polymer film may be absent since this will not affect the damage resistance.

The other details are the same as explained above for the first aspect.

The third aspect of the invention is a hologram comprising a hologram film in which a diffraction grating has been recorded, a substrate situated on one side of the hologram film via a bonding material, and a polymer film situated on the other side of the hologram film via a bonding material, characterized in that the polymer film has been subjected to prior heat treatment.

Heat shrinkage of the polymer film is an irreversible change. Addition of the prior heat treatment can therefore produce sufficient heat shrinkage of the polymer film.

This can prevent heat shrinkage of the polymer film after the hologram has been formed, thus minimizing deformation of the hologram film.

It is thereby possible to obtain a hologram in which deformation of the interference pattern functioning as the diffraction grating, which causes deformation of the hologram film, is minimized, and changes in the spectral characteristics, etc. by heat are minimized.

According to the third aspect it is possible to provide holograms with excellent heat resistance.

The optimum temperature and optimum heat time for the heat treatment will differ depending on the quality, thickness, etc. of the polymer film, but for example when the polymer film consists of a polyester film with a thickness of 100–200 μm, a temperature of 80–150° C. and a heating time of 30 minutes to 6 hours is preferred.

By satisfying these heating conditions it is possible to obtain a polymer film that has sufficient heat shrinkage and is resistant to any further shrinkage.

The fourth aspect of the invention is a hologram comprising a hologram film in which a diffraction grating has been recorded, a first polymer film is situated on one side of the hologram film via a bonding material, a substrate is situated via a bonding material on the side of the first polymer film on which the hologram film is not situated, and a second polymer film is situated on the other side of the hologram film via a bonding material, characterized in that the first polymer film has been subjected to prior heat treatment.

This heat treatment can prevent heat shrinkage of the first polymer film after the hologram has been formed, thus minimizing deformation of the hologram film.

It is thereby possible to obtain a hologram in which deformation of the interference pattern functioning as the diffraction grating, which causes deformation of the hologram film, is minimized, and changes in the spectral characteristics, etc. by heat are minimized.

According to the fourth aspect it is possible to provide holograms with excellent heat resistance.

The other details are the same as explained above for the third aspect.

According to the first to fourth aspects, the polymer film preferably has a polarizing optical property.

The hologram displays an image by diffraction/scattering or reflection of an incident image beam, but diffraction/scattering and reflection of light other than the image beam also occurs. This noise light in addition to the image beam often impairs the visibility of the image.

Since light other than the image beam is usually light of random polarization, by converting the image beam to a linear polarized beam aligned with the transmission axis of the polarizing polymer film it is possible to obtain an effect whereby the noise light is removed from the image since the noise light which is light of random polarization is absorbed by the polarizing polymer film, while the polarizing polymer film has absolutely no effect on the image beam which is a linear polarized beam.

The polarizing optical property is an optical property whereby the transmission differs depending on the direction of light polarization. Specifically, the transmission of light of random polarization wherein the direction of polarization is scattered is about 50%, and virtually all of the linear polarized light with the same direction of polarization is transmitted. However, virtually all linear polarized light having a direction of polarization shifted by 90° is absorbed, so that the transmission is about 0%.

The hologram is preferably a hologram screen displaying an image by diffraction or scattering of an irradiated beam containing image data.

Upon irradiation of the irradiated beam which has recorded image data on the hologram, the irradiated beam is diffracted by the interference pattern of the hologram film, becoming diffracted light.

The holograms according to the aforementioned first to fourth aspects of the invention have minimal deformation of the hologram films and minimal deformation of the interference patterns in the hologram films. Alterations in the direction of diffraction due to deformation of the interference patterns are therefore prevented, so that changes in the spectral characteristics of the holograms can thus be minimized.

It is therefore possible to obtain hologram screens which produce minimal hue between the irradiated beam and the image displayed on the screen, even when used at high temperatures.

The hologram is preferred to be a hologram reflector element that displays a virtual image by reflecting image data irradiated as an irradiated beam.

According to the prior art, heat shrinkage of the polymer film has partially altered the curvature of concave or convex surfaces in cases where the diffraction grating recorded on the hologram film has a concave shape or convex shape. A problem has therefore existed in that the magnification rate of the displayed image changes, thus warping the image.

The hologram of the present invention, however, has high heat resistance which prevents heat shrinkage of the polymer film, and therefore it is possible to obtain a hologram reflector element with minimal image warping even when used at high temperatures.

The fifth aspect of the invention is a hologram production process which is a continuous production process for holograms whereby there is prepared a photopolymer coated onto a substrate and the photopolymer surface of the photopolymer is affixed onto a photographed object original, after which it is exposed to laser light to copy the photographed object original onto the photopolymer to convert it into a hologram, the hologram is then released from the photographed object original together with the substrate to expose the hologram surface of the hologram, and finally a protective film is affixed onto the hologram surface, characterized in that the bonding strength A between the substrate and the hologram is greater than the bonding strength B between the hologram and the protective film.

If the bonding strength A is less than the bonding strength B, there is a risk that when the hologram undergoes deformation due to uneven external forces, etc. when the protective film is affixed onto the hologram, the deformation of the hologram will be transferred completely to the protective film (see FIG. 16B described below). The possibility exists that the deformed protective film may keep the deformed state of the hologram even after the external force has ceased.

According to this aspect, the protective film used may be one comprised of, for example, polyethylene, polyester, polypropylene, etc.

The substrate may also be one comprised of, for example, polyethylene, polyester, polypropylene, etc., similar to the protective film.

The photopolymer used may be, for example, a photopolymerizing or photocrosslinking type of material.

The protective film is provided to protect the hologram surface of the hologram, and it may be removed for actual use of the hologram.

The substrate and hologram are bonded together by the viscosity of the photopolymer itself.

The hologram and the protective film may be bonded, for example, by introducing the hologram and the protective film between two attachment rollers to affix them together, as shown in FIG. 12D described below.

The bonding strength between the substrate and the hologram is preferably 150–800 g/50 mm. If it is less than this range the hologram (photopolymer) may be damaged when the hologram is released from the photographed object original. If it is greater than this range, it may become very difficult to remove the substrate after formation of the hologram.

The photographed object original may be copied by affixing the photopolymer onto the photographed object original and then irradiating it with laser light to expose the photopolymer to laser light. The laser light irradiation can be accomplished from the side of the substrate 211 and the photopolymer 210 as in FIG. 12B, or from the side of the photographed object original as in FIG. 13. A reflecting-type hologram can be fabricated in the former case, and a transmission-type hologram in the latter case.

The photopolymer surface is the surface on the side opposite the side on which the substrate is bonded. The hologram surface is on the same side as the photopolymer surface, and it is the surface which had been affixed to the photographed object original (see FIG. 1).

The most notable feature of the fifth aspect is that the bonding strength A between the substrate and hologram is greater than the bonding strength B between the hologram and protective film.

When the protective film 215 is affixed to the hologram 201 with the substrate 211 attached as shown in FIG. 16A, deformed sections 301, 351 are formed on the protective film 215 and the hologram 201, as shown in FIG. 16B.

Since the hologram 201 obtained by the production process according to the fifth aspect has higher bonding strength between the substrate 211 and the hologram 201, the hologram 201 becomes anchored to the substrate 211. In comparison to the substrate 211, the protective film 215 is in a freer state with respect to the hologram 201.

Thus, as shown in FIG. 16B, the deformed sections 301 of the hologram 201 are removed by the restoring force F of the hologram 201, and the deformed sections 351 of the protective film 215 are removed by the restoring force of the protective film 215, resulting in a hologram 201 and protective film 215 with virtually no deformed sections 301, 351, as shown in FIG. 16C.

According to this fifth aspect, it is possible to provide a process for the production of holograms with minimal appearance defects.

When the hologram is used as a screen and an image beam is irradiated from a projector onto the hologram screen as shown for example in FIG. 14 described below, the appearance defects that are caused by the deformed sections of the hologram can be clearly seen by viewers as string-like blemishes or emboss-like blemishes over the image, as shown in FIG. 15B described below.

When the hologram is used as a screen, a plurality of diffraction gratings are recorded on the hologram, but when the hologram contains deformed sections, the diffraction gratings lose their shape as a result of the deformed sections, thus presenting appearance defects.

The protective film affixed to the hologram surface is preferably a release film provided with at least one type of coating selected from among silicon-based, olefin-based and fluorine-based coatings on at least the attachment surface. The use of such a release film allows the effect of the fifth aspect to be adequately achieved.

After the hologram has been released from the photographed object original, the hologram is subjected to polymerization treatment until attachment of the protective film, and the bonding strength A between the substrate and the hologram is preferably greater than the bonding strength B between the hologram and the protective film.

The hologram will have a higher hardness if the polymerization ratio is higher. A higher hardness minimizes deformation, etc., and therefore this polymerization treatment can give a hologram with fewer appearance defects. A higher polymerization ratio also results in lower viscosity, and is preferred in order to lower the bonding strength between the hologram and the protective film.

The polymerization ratio of the hologram is preferably 50–100%. This makes it possible to consistently achieve an effect of increased hardness by the polymerization ratio.

If the polymerization ratio is under 50% there is a risk of insufficient hardness which may result in deformation of the hologram during attachment, producing appearance defects.

The polymerization treatment is preferably carried out by heating and/or ultraviolet irradiation of the hologram.

This allows the polymerization treatment to be accomplished easily due to reaction of the unreacted monomers. The hologram can therefore be easily hardened.

"Heating and/or ultraviolet irradiation" refers to heating and ultraviolet irradiation, or heating alone or ultraviolet irradiation alone.

When both heating and ultraviolet irradiation are carried out, they may be carried out simultaneously or separately. The heating temperature, heating time, and the ultraviolet wavelength, intensity and irradiation time will differ depending on the type of photopolymer, the thickness of the photopolymer, etc.

The sixth aspect of the invention is a hologram production process which is a continuous production process for holograms whereby there is prepared a photopolymer coated onto a substrate and the photopolymer surface of the photopolymer is affixed onto a photographed object original, after which it is exposed to laser light to copy the photographed object original onto the photopolymer to convert it into a hologram, the hologram is then released from the photographed object original together with the substrate to expose the hologram surface of the hologram, and finally a protective film is affixed onto the hologram surface, characterized in that at least the attachment surface of the protective film is coated with at least one type of tackifier 159 as shown in FIG. 18, selected from among synthetic resin-based, synthetic rubber-based, silicone-based and polyurethane-based tackifiers.

If no tackifier is present, the hologram will sometimes undergo deformation by external force during attachment of the protective film onto the hologram, and this hologram deformation will be completely retained by the protective film. The deformation of the hologram can thus completely remain even after the external force has ceased.

By providing a tackifier as a buffer layer between the hologram and the protective film, it is possible to obtain a hologram with few appearance defects because deformation of the hologram by external force is prevented.

The thickness of the tackifier is preferably 1 μm to 3 mm. If it is lower than this range it cannot perform its role as a buffer layer, and the buffer layer may provide an inadequate effect. If it is higher than this range the tackifier may bleed from the protective film when the protective film with the tackifier passes through the mounting section 225 of the light exposure apparatus 202, as shown in FIG. 13, thus creating an inconvenience.

The hardness of the tackifier is preferably softer than the hologram. This will provide a further buffering effect.

The seventh aspect of the invention is a hologram production process which is a continuous production process for holograms whereby there is prepared a photopolymer coated onto a substrate and the photopolymer surface of the photopolymer is affixed onto a photographed object original, after which it is exposed to laser light to copy the photographed object original onto the photopolymer to convert it into a hologram, the hologram is then released from the photographed object original together with the substrate to expose the hologram surface of the hologram, and finally a protective film is affixed onto the hologram surface, characterized in that the bonding strength between the hologram and the protective film is no greater than 200 g/50 mm.

The bonding strength is determined by the degree of force applied when a 50-mm wide affixed protective film and the hologram are peeled apart at 180° at a rate of 300 mm/min.

If the bonding strength is greater than 200 g/50 mm, the hologram will be strongly anchored on both the protective film-hologram side and the substrate-hologram side, and this may make it difficult to restore deformation by the elasticity of the hologram.

According to the seventh aspect it is possible to obtain a hologram wherein the bonding strength between the hologram and the protective film is within the range specified above.

Since the bonding strength between the hologram 201 and the protective film 215 is sufficiently low, the deformed sections 301, 351 of the hologram 201 and the protective film 215 are removed by the restoring force F of the hologram 201 itself, as shown in FIG. 16B explained below, resulting in a hologram 201 and protective film 215 with virtually no deformed sections 301, 351, as shown in FIG. 16C.

Thus, according to the seventh aspect it is possible to obtain a hologram wherein deformation of the hologram by external force is prevented, thus reducing appearance defects.

The protective film affixed onto the hologram surface is preferably a release film provided with at least one type of coating selected from among silicon-based, olefin-based and fluorine-based coatings on at least the attachment surface. The use of such a release film allows the effect of the seventh aspect to be adequately achieved.

After the hologram has been released from the photographed object original, the hologram is subjected to polymerization treatment until attachment of the protective film, and the bonding strength A between the hologram and the protective film is preferably no greater than 200 g/50 mm.

The hologram will have a higher hardness if the polymerization ratio is higher. A higher hardness minimizes deformation, etc., and therefore this polymerization treatment can give a hologram with fewer appearance defects.

The polymerization treatment is preferably carried out by heating and/or ultraviolet irradiation of the hologram.

This allows the polymerization treatment to be accomplished easily due to reaction of the unreacted monomers. The hologram can therefore be easily hardened.

The details have already been explained above.

The bonding strength is more preferably 5–150 g/50 mm.

This will allow the effect of the seventh aspect to be achieved more consistently.

If the bonding strength is less than 5 g/50 mm, air bubbles will tend to be included between the hologram and the protective film when they are affixed together, and traces of the air bubbles will remain in the hologram and may cause appearance defects.

If the bonding strength is greater than 150 g/50 mm, there will be a possibility of larger emboss-like blemishes (see Embodiment 4).

According to aspects 5 to 7, a diffuser panel with a screen effect is preferably recorded in the hologram.

This makes it possible to obtain a hologram able to constitute an excellent screen with minimal blemishes, etc. in reflected images (see FIG. 15A).

BRIEF DESCRIPTION OF THE DRAWINGS

FIG. 6 is a graph showing the change in spectral characteristics of a hologram according to Embodiment 2 before and after a high temperature durability test, wherein the polymer film of this embodiment has been heat treated beforehand.

FIG. 7 is a graph showing the change in spectral characteristics of a hologram before and after a high temperature durability test for an embodiment of the prior art, as compared to Embodiment 2.

FIG. 17 is a sketch of an exposure apparatus capable of accomplishing polymerization treatment of a hologram by heat and ultraviolet irradiation, for Embodiment 5.

FIG. 19 is a front view of a Smoke Barrier Embodiment 1 of a smoke barrier described later.

FIG. 22 is an illustration of multiple smoke barriers provided on the ceiling along a pathway where a moving sidewalk is installed, according to Smoke Barrier Embodiment 2.

DESCRIPTION OF THE PREFERRED EMBODIMENTS

Embodiment 1

Figure 2:
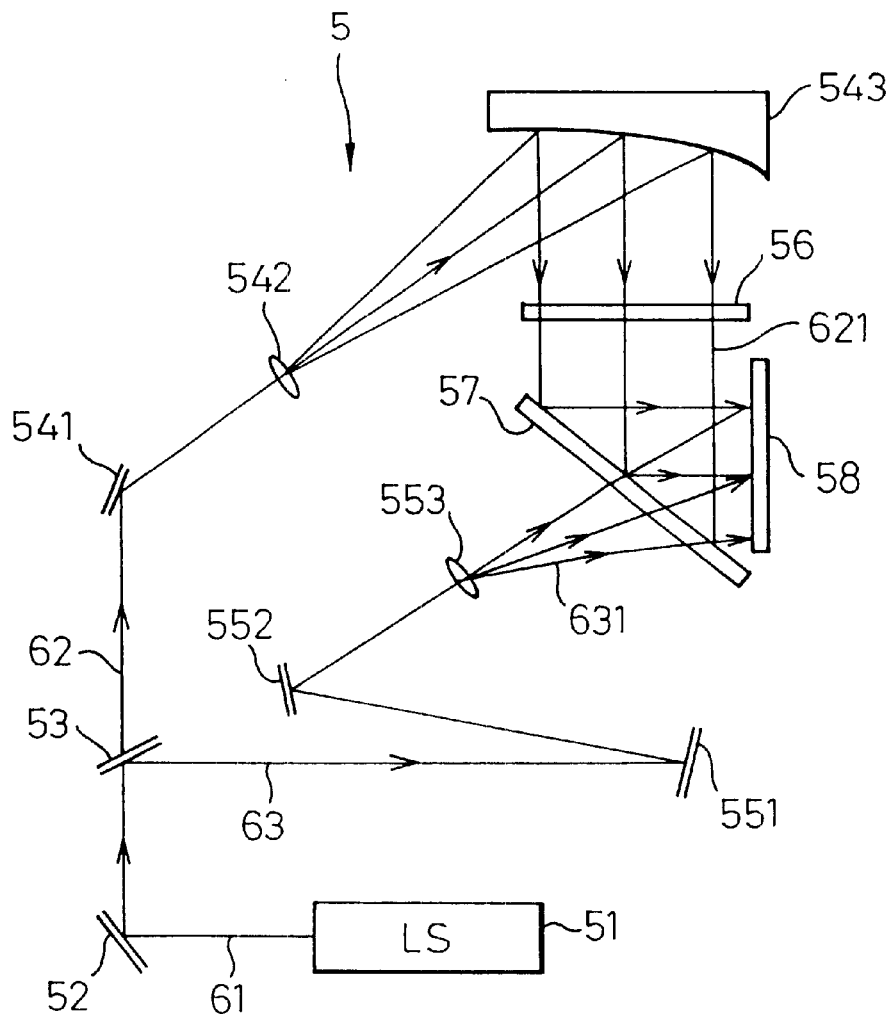
FIG. 2 is a sketch showing an exposure optical system for fabrication of a hologram film according to Embodiment 1.
Figure 3:
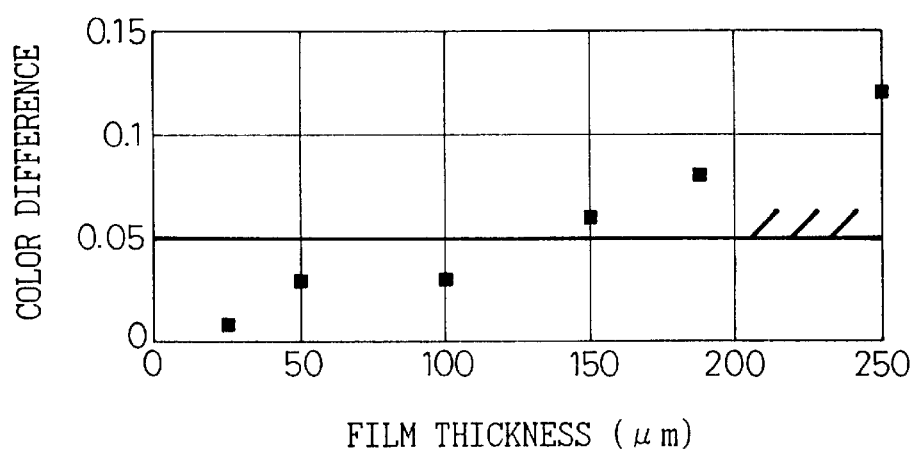
FIG. 3 is a graph showing the relationship between polymer film thickness and color difference according to Embodiment 1.

A hologram according to an embodiment of the invention will now be explained with reference to FIGS. 1 to 3.

Figure 1:
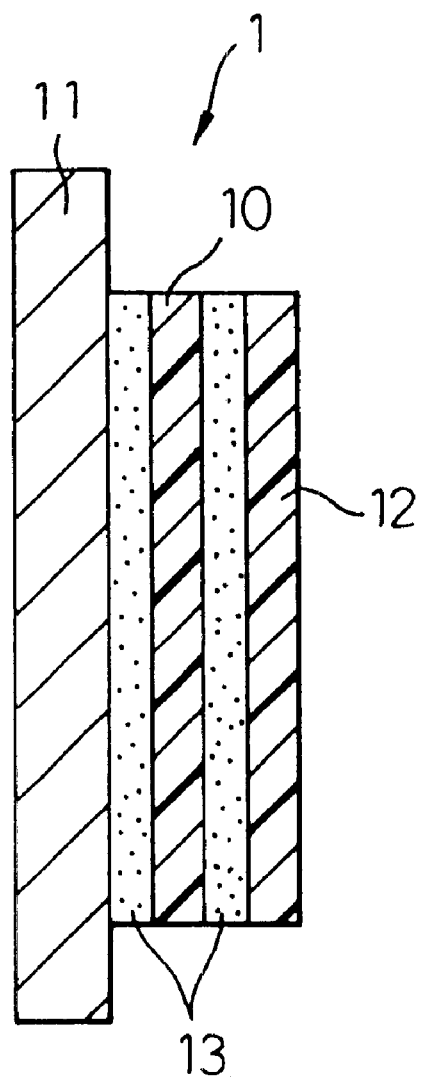
FIG. 1 is a cross-sectional view of a hologram according to Embodiment 1.

As shown in FIG. 1, the hologram 1 of this embodiment comprises a hologram film 10 with a recorded diffraction grating, a substrate 11 situated on one side of the hologram film 10 via a bonding material 13, and a polymer film 12 situated on the other side of the hologram film 10 via a bonding material 13.

The thickness of the polymer film 12 is 100 $\mu$m or smaller.

This will now be explained in detail.

The hologram 1 of this embodiment functions as a hologram screen.

In the hologram 1, the substrate 11 consists of an 8-mm glass plate and the polymer film 12 consists of a polyester film, while the bonding materials 13 bonding these with the hologram film 10 are both acrylic-based tackifiers at a thickness of 25 $\mu$m.

The polymer film 12 can prevent damage to the surface of the hologram film 10, while also preventing penetration of moisture between the hologram film 10 and the substrate 11.

A process for fabricating the hologram film 10 of this embodiment will now be explained in simple terms with reference to FIG. 2.

The light path of coherent light 61 emitted from a laser light source 51 of an exposure optical system 5 is bent with a mirror 52, and is then split with a half mirror 53 into a optical path for an object beam 621 and a reference beam 631.

The beam 62 which has parted in one direction (left of the drawing) is then converted to parallel rays through a mirror 541, object lens 542 and a non-symmetrical parabolic mirror 543, and subsequently passes through a light diffuser 56 to form an object beam 621 and is reflected by a half-mirror 57 to strike a monomer-containing photosensitive material 58.

Meanwhile, the other beam 63 parting at the half-mirror 53 is reflected at mirrors 551, 552 and converted to a divergent beam at an object lens 553, after which it passes through the half-mirror 57 to strike the photosensitive material 58 as a reference beam 631.

As a result, an interference pattern is formed from the reference beam 631 and the object beam 621, and this interference pattern is recorded in the photosensitive material 58 to produce a transmission-type hologram film 10.

By situating this type of hologram film 10 between the aforementioned substrate 11 and polymer film 12 via bonding materials 13 as shown in FIG. 1, it is possible to obtain a hologram 1 which functions as a screen.

An irradiated beam bearing recorded image data is irradiated from a liquid crystal projector or the like onto the resulting hologram 1. The direction of the irradiated beam is the same direction as that of the reference beam 631.

By transmitting this irradiated beam, the irradiated beam becomes diffracted light due to the interference pattern formed in the hologram film 10. This diffracted light is the same light as the scattered light formed by passage through the light diffuser 56.

The hologram 1 thus functions as a screen by displaying an image similar to that of an irradiated beam striking a light diffuser.

The performance of the hologram 1 of this embodiment was evaluated by the following test.

Holograms 1 as shown in FIG. 1 were prepared wherein the thickness of the polymer film 12 was 25, 50, 100, 150, 188 or 250 $\mu$m. Each of the holograms was subjected to a high temperature durability test.

The high temperature durability test was carried out by allowing each hologram to stand for 1200 hours in a thermostatic chamber at a temperature of 60° C.

After the high temperature durability test, each hologram was used as a screen and white light was irradiated onto the screen. The white image reflected onto the screen was measured using a color luminosity meter (BM-7, manufactured by TOPCON CORP.) The results of the measurement are shown in FIG. 3 based on color difference as changes on a CIE chromaticity coordinate (u'v' coordinate).

The defining equation for the color difference is the following.

$$\text{Color difference} = \{(u'_o - u'_T)^2 + (v'_o - v'_T)^2\}^{1/2}$$

$u'_o$: u' on chromaticity coordinate prior to test
$v'_o$: v' on chromaticity coordinate prior to test
$u'_T$: u' on chromaticity coordinate after test
$v'_T$: v' on chromaticity coordinate after test Upon observation of the image reflected on each hologram, it was found that the hue changed particularly around the perimeter of the image reflected on the hologram in the high temperature durability test. The degree of change in hue was seen to increase with greater polymer film thickness.

Incidentally, a color difference of greater than 0.05 is normally visible to the human eye as two different colors.

As shown in the drawing, the color difference can be limited to less than 0.05 by limiting the polymer film thickness to no greater than 100 μm, so that it is possible to obtain a hologram with no change in hue of the image before and after a high temperature durability test.

The action and effect of this embodiment will now be explained.

Because the hologram film is thin with low rigidity, it undergoes deformation in conformity with deformation of the substrate or polymer film.

When used in high temperature environments the polymer film undergoes heat shrinkage while the substrate undergoes almost no heat shrinkage. The hologram film is deformed by motion stress during heat shrinkage of the polymer film, but if the thickness of the polymer film is reduced even further as according to this embodiment, it is possible to sufficiently reduce the stress acting on the hologram film.

It is thus possible to obtain a hologram in which deformation of the hologram film is minimized as is deformation of the interference pattern functioning as the diffraction grating recorded in the hologram film, which is a cause of deformation of the hologram film, to obtain a hologram wherein variation in the spectral characteristics due to heat is minimized.

Thus, when the hologram of this embodiment is used as a screen, it is possible to reduce the color difference between the irradiated beam and the image displayed on the hologram, so as to be virtually indistinguishable to the human eye.

According to this embodiment, a hologram with excellent heat resistance can be provided.

Embodiment 2

This embodiment will illustrate a hologram with the same construction as Embodiment 1.

The hologram of this embodiment comprises a hologram film with a recorded diffraction grating, a substrate situated on one side of the hologram film via a bonding material, and a polymer film situated on the other side of the hologram film via a bonding material, as shown in FIG. 1 described above.

The polymer film is subjected to prior heat treatment.

The hologram film of this embodiment was fabricated with the same type of exposure optical system as Embodiment 1. The substrate and bonding material were also the same types as for Embodiment 1.

The polymer film used for this embodiment was a PET (polyethylene terephthalate) film ("Rumikuru No. 1501" manufactured by LINTEC CO. LTD.) heat treated at a temperature of 90° C. for 2 hours.

The hologram obtained in this manner was subjected to a high temperature durability test in the same manner as Embodiment 1. The temperature was 60° C. and the time was 1200 hours.

Figure 4:
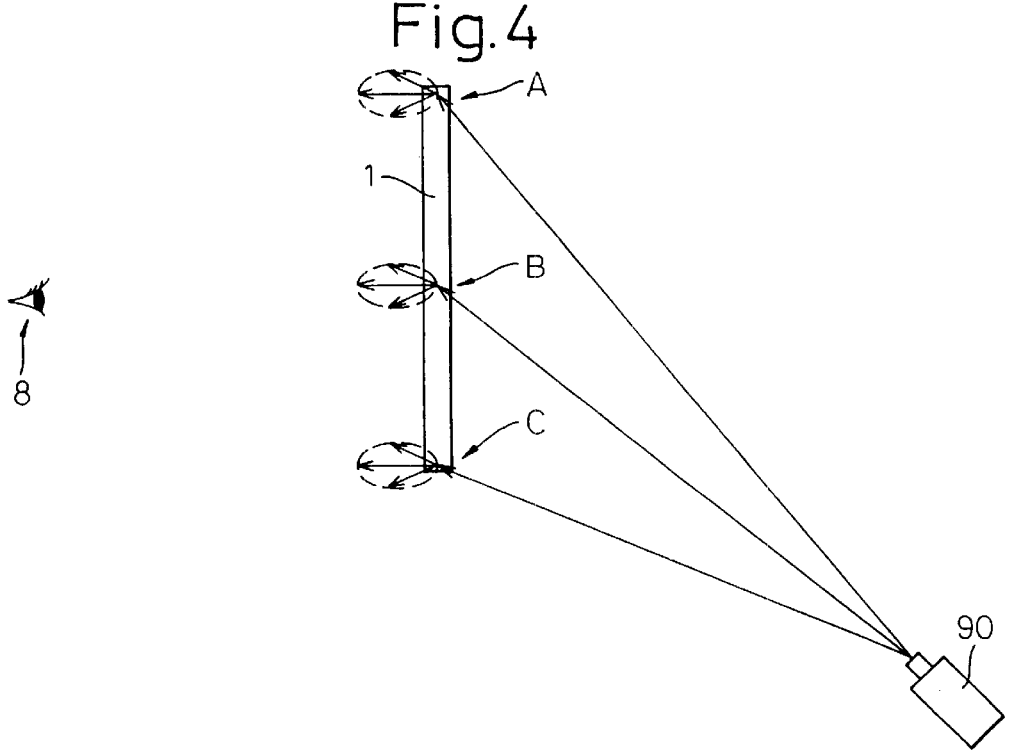
FIG. 4 is an illustration of a method of measuring the spectral characteristics of a hologram according to Embodiment 2.
Figure 5:
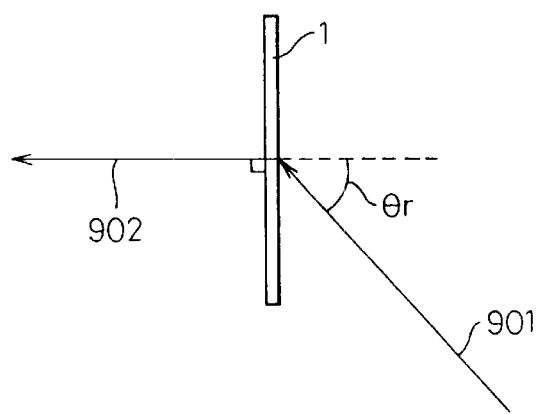
FIG. 5 is an illustration of a method of measuring the spectral characteristics of a hologram according to Embodiment 2.

The spectral characteristics of the hologram before and after this test were measured according to the methods illustrated in FIG. 4 and FIG. 5. As shown in FIG. 5, white light 901 was directed incident to the hologram 1 at angle θr (where θr is an angle equal to the angle of incidence of the reference beam to the photosensitive material in the exposure optical system used to construct the hologram film), and the efficiency of the wavelength of the diffracted light 902 exiting specifically at the 0° direction among the diffracted light from the hologram 1 was measured (=100×(intensity of diffracted light at 0° direction/intensity of white light)). The 0° direction is the direction normal to the surface of the hologram 1.

This method was used to measure the spectral characteristics of section A and section C at either end of the hologram and section B at the center of the hologram 1, as shown in FIG. 4. The numeral 90 in the diagram indicates a liquid crystal projector used for irradiation, and 8 is a viewer.

The results of the measurement are shown in FIG. 6. FIG. 6(A) represents the spectral characteristics at section A, FIG. 6(B) at section B and FIG. 6(C) at section C; the solid lines represent the characteristics before the high temperature durability test and the broken lines represent the characteristics after the test.

As shown in these graphs, there was virtually no change in spectral characteristics before and after the test for the hologram of this embodiment which employed a heat treated polymer film.

When an actual image was displayed on this hologram, the viewer 8 could perceive no change in the image on the hologram.

For comparison with these results, a hologram was then prepared with exactly the same structure as the previous hologram 1, but employing a non-heat-treated PET film as the polymer film. This hologram was also subjected to a high temperature durability test in the same manner as above and the spectral characteristics before and after the test were measured by the same method.

The results are shown in FIG. 7. FIG. 7(A) represents the spectral characteristics at section A, FIG. 7(B) at section B and FIG. 7(C) at section C; the solid lines represent the characteristics before the test and the broken lines represent the characteristics after the test.

As seen in these graphs, the spectral characteristics at section A showed a peak shift toward the blue wavelength region, section B showed virtually no change, and section C showed a peak shift toward the green region.

In other words, it was shown that the hologram after the high temperature durability test exhibits shifts in the spectral characteristic peaks depending on the site, thus creating large changes in hue particularly around the perimeter of the hologram.

When an actual image was displayed on the hologram, the viewer 8 could perceive large color shifts at the perimeter of the hologram.

For comparison with this embodiment, holograms were prepared utilizing polyester films heat treated beforehand at 100° C. for one hour as the polymer films. A plurality of such holograms were prepared with different polymer film thicknesses.

Figure 8:
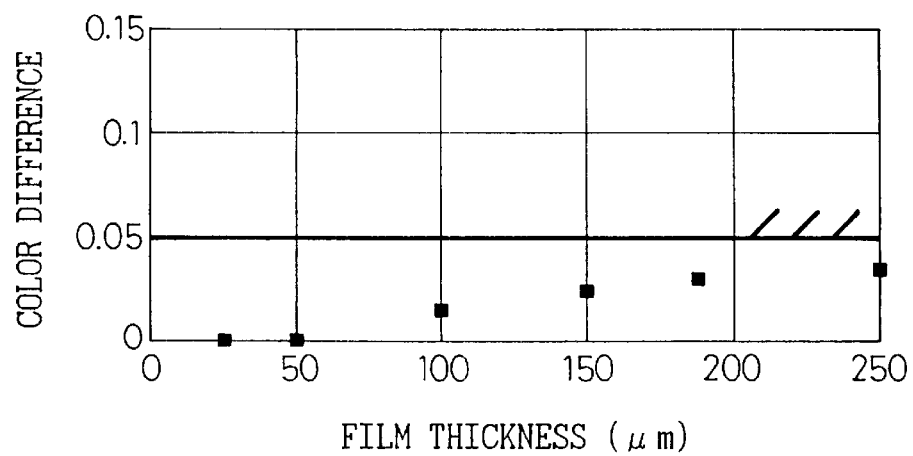
FIG. 8 is a graph showing the relationship between the first polymer film thickness and color difference for a hologram according to Embodiment 2.

These holograms were subjected to the high temperature durability test described for Embodiment 1, and the color differences before and after the test were measured. The results are shown in FIG. 8.

As will be understood from this graph, the prior heat treatment resulted in holograms with minimal hue changes in the images as evidenced by a color difference of 0.05 or less, even when the film thickness was 150 µm or greater.

The heat treatment of the polyester film may be carried out on the polyester film alone or after it has been coated with the bonding material. As shown in FIG. 8, the color differences increases with greater film thickness. The color difference can be further reduced by taking measures such as increasing the temperature or increasing the time of the heat treatment.

Embodiment 3

This embodiment will illustrate a hologram that can be used as a reflection-type hologram reflector element.

Figure 9:
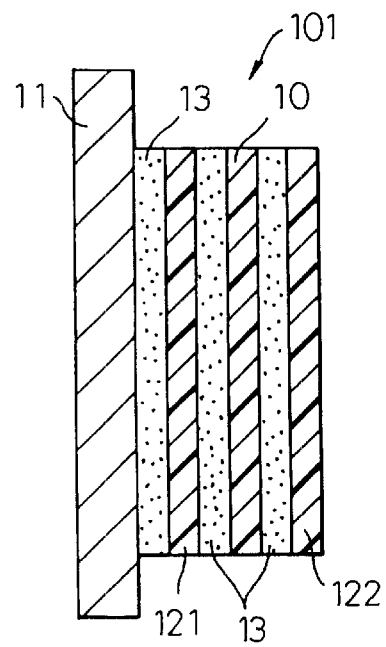
FIG. 9 is a cross-sectional view of a hologram according to Embodiment 3, wherein the hologram film is sandwiched between a first polymer film and a second polymer film.

As shown in FIG. 9, the hologram 101 of this embodiment has a construction wherein the hologram film 10 is sandwiched on both sides between polymer films 121, 122 consisting of two TAC films (triacetyl cellulose films) via bonding materials 13, and a substrate (glass) 11 is bonded to the outer side of the TAC film 121 on one side via a bonding material 13.

Figure 10:
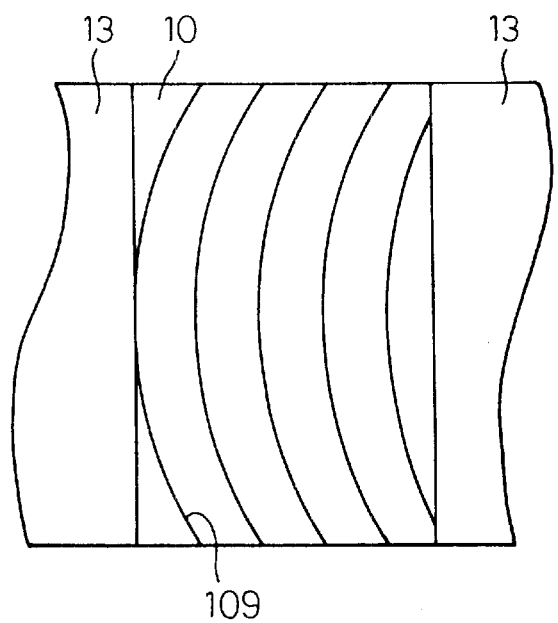
FIG. 10 is a sketch showing a diffraction grating lying in a hologram film according to Embodiment 3.

A diffraction grating 109 is recorded inside the hologram film 10 as shown in FIG. 10, and the diffraction grating 109 has the shape of a concave mirror. The hologram of this embodiment therefore has a magnified reflection function.

The performance of the hologram 101 of this embodiment was evaluated by the following test.

Different holograms were prepared wherein the thickness of the second polymer film 122 on the side opposite that of the substrate 11 was 25 µm and the thickness of the first polymer film 121 between the substrate 11 and the hologram film 10 was 25, 50, 100, 150 or 200 µm. Each of the holograms was subjected to a high temperature durability test in the same manner as Embodiment 1.

Incidentally, a known problem with display apparatuses using holograms as reflector elements is that heat shrinkage of the first polymer film 121 causes shrinkage particularly of the perimeter of the hologram, and when the diffraction grating recorded in the hologram layer 10 is a concave shape, the curvature of the concave surface of the perimeter is reduced, increasing the magnifying effect at the perimeter.

Consequently, the magnification of the displayed image varies toward the perimeter of the hologram, resulting in a warped image.

A value representing the degree of warping is the diffraction angle of the diffraction grating of the hologram film after the test with respect to the diffraction angle of the diffraction grating before the test.

Figure 11:
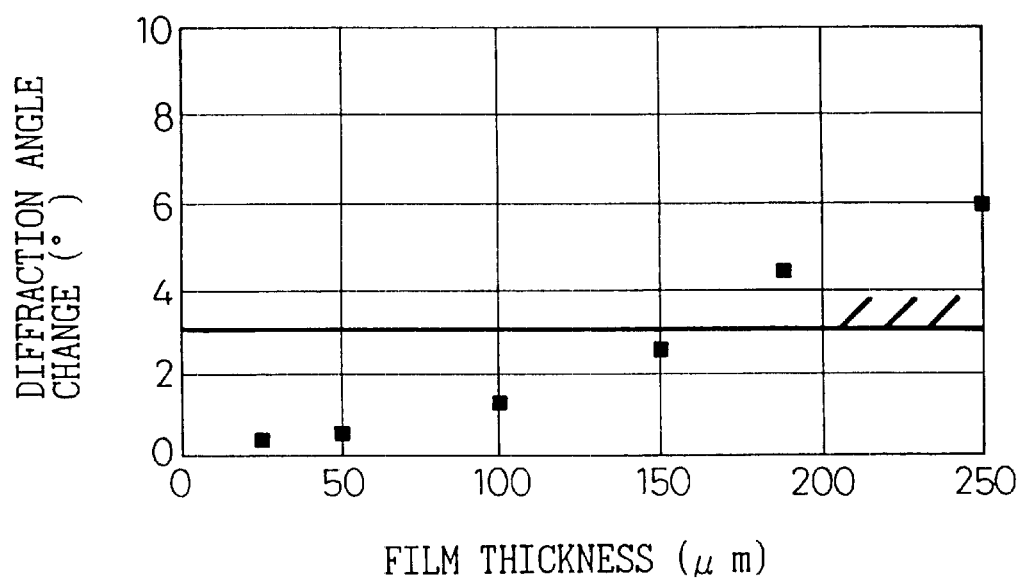
FIG. 11 is a graph showing the relationship between the polymer film thickness and the diffraction angle change for Embodiment 3.

FIG. 11 shows the relationship between this change and the film thickness of the first polymer film 121.

Incidentally, the human eye generally judges an image to be deformed when the diffraction angle is larger than 3°.

FIG. 11 shows that the film thickness of the first polymer film must be no greater than 150 µm.

Heat shrinkage can also be reduced by the structure of this embodiment, by heat treatment (100° C., 2 hours) of the first polymer film in the same manner as Embodiment 2. Such treatment can result in reduction of the gradient of the diffraction grating to achieve a diffraction angle change of no greater than 3°, even if the first polymer film used has a thickness exceeding 150 µm.

Embodiment 4

A process for producing a hologram according to this embodiment of the invention will now be explained with reference to FIGS. 12 to 16.

Figure 12A:
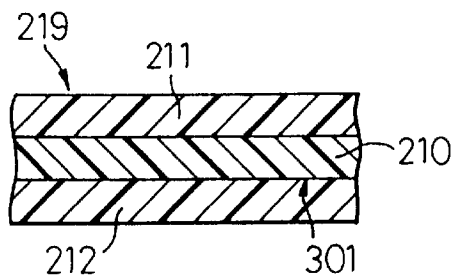
FIGS. 12A, 12B, 12C and 12D are cross-sectional views illustrating a process for producing a hologram according to Embodiment 4.
Figure 12B:
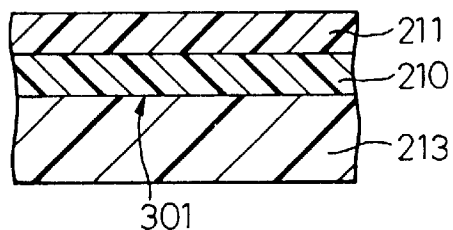

As shown in FIG. 12A, a photopolymer 210 coated on a substrate 211 is prepared, the protective layer 212 is peeled off, and the photopolymer surface 301 of the photopolymer 210 is affixed onto a photographed object original 213 as shown in FIG. 12B, after which it is subjected to laser light exposure to copy the photographed object original 213 onto the photopolymer 210 to make a hologram 201.

Figure 12C:
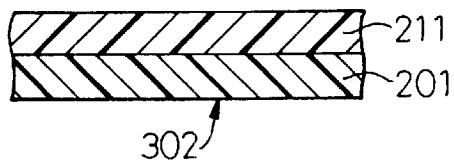
Figure 12D:
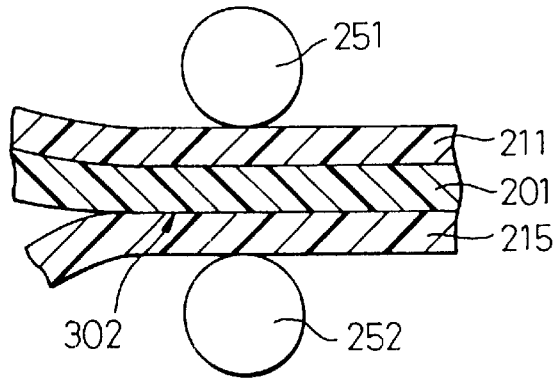

Next, the hologram 201 is peeled off with the substrate 211 from the photographed object original 213, exposing the hologram surface 302 of the hologram 201 as shown in FIG. 12C, and then the protective film 215 is affixed onto the hologram surface 302, as shown in FIG. 12D.

In the hologram 201 obtained in this manner, the bonding strength A between the substrate 211 and the hologram 201 is greater than the bonding strength B between the hologram 201 and the protective film 215.

Figure 13:
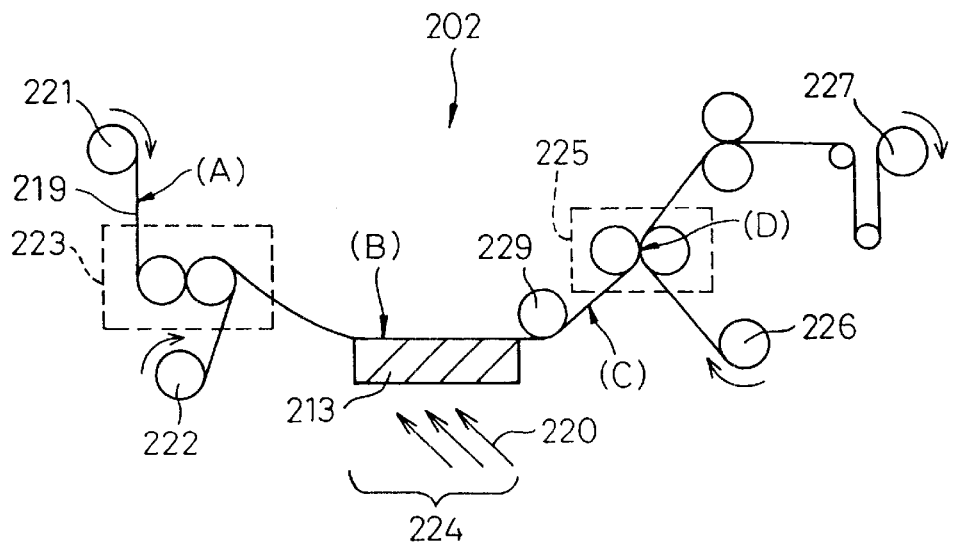
FIG. 13 is a sketch of an exposure apparatus for production of a hologram according to Embodiment 4.

The light exposure apparatus 202 used for this embodiment is shown in FIG. 13.

As seen in this drawing, the light exposure apparatus 202 has a construction wherein a long film 219, described below, is conveyed from left to right in the drawing through multiple rollers provided at each section, and is exposed to laser light in a continuous manner at the light exposure section 224.

This will now be explained in detail.

As shown in FIG. 12, a 100 m-long roll-shaped film 219 with a width of 350 mm, comprising a photopolymer 210 sandwiched between a substrate 211 and a protective material 212, is prepared. The substrate 211 and protective film 212 are made of polyester films, and the photopolymer 210 used is a photopolymerizable photosensitive material.

The substrate 211 and photopolymer 210 are bonded by the viscosity of the photopolymer 210 itself. The substrate 211 has a thickness of 50 µm, and the photopolymer has a thickness of 10 µm.

Next, as shown in FIG. 13, the film 219 is set on the supply roller 221 of the light exposure apparatus 202, and the supply roller 221 is driven. This conveys the film 219 to the protective material peeling section 223. FIG. 12A shows the state of the film 219 at section (A) of the light exposure apparatus 202.

At the protective material peeling section 223, the protective material 212 is peeled from the film 219, thus exposing the photopolymer surface 301. The protective film 212 peeled off at this point is wound up on a winding roller 222.

The film 219 from which the protective material 212 has been peeled off is then conveyed to the light exposure section 224 where the photographed object original 213 is situated. The photographed object original 213 is a hologram having a recorded light diffuser such as frosted glass, and it is one which functions as a screen by irradiation of an image beam.

At the light exposure section 224, the film 219 is oriented so that the photopolymer surface 301 faces the photographed object original 213 and, as shown in FIG. 12B, it is affixed onto the photographed object original 213 by the roller 229. FIG. 12B shows the state of the film 219 at section B of the light exposure apparatus 202.

Next, laser light 220 (Ar laser light of 514 nm wavelength, approximately 20 mJ/cm$^2$) is irradiated from the side of the photographed object original 213, for laser light exposure. This copies the photographed object original 213 to the photopolymer 210, so that the photopolymer 210 becomes a hologram.

The protective film attachment section 225 is then moved upward to peel the hologram 201 with the substrate 211 from the photographed object original 213. This exposes the hologram surface 302 as shown in FIG. 12C. FIG. 12C shows the state of the film 219 at section (C) of the light exposure apparatus 202.

The film 219 is then conveyed to the protective film attachment section 225 comprising attachment rollers 251, 252.

At the protective film attachment section 225, the hologram 201 bonded to the substrate 211 and the protective film 215 fed by the feeding roller 226 are introduced between two attachment rollers 251, 252 made of nitrile rubber, as shown in FIG. 12D. The protective film 215 is a release film consisting of a polyester film coated with silicone, and it has a thickness of 38 µm.

By passing between the attachment rollers 251, 252, the films are compressed and bonded together. FIG. 12D shows the state of the hologram 201 at section D of the light exposure apparatus 202.

The conveying speed at the attachment section 225 is 1 m/min, and the pressure between the attachment rollers 251, 252 is 2 kg/cm$^2$. The hologram 201 fed from the attachment section 225 of the protective film 215 is wound up on a winding roller 227.

This produces a long hologram 201 wherein the hologram surface 302 is protected by a protective film 215.

The hologram 201 obtained by the production process described above was examined by peeling off the substrate 211 and protective film 215 to determine the relationship between the bonding strength A between the substrate 211 and hologram 201 and the bonding strength B between the hologram 201 and protective film 215. The result was that the hologram 201 remained on the substrate 211 side. This demonstrated that the bonding strength A was greater than the bonding strengths.

The bonding strength B was determined to be 10 g/50 mm by measuring the 180° peel strength.

After cutting the protective film 215 and substrate 211 to an appropriate size from the hologram 201 obtained by the production process described above, they were both peeled off to prepare a hologram element. The hologram element was affixed onto a transparent substrate made of a glass panel by a tacky film to construct a hologram screen 231.

Figure 14:
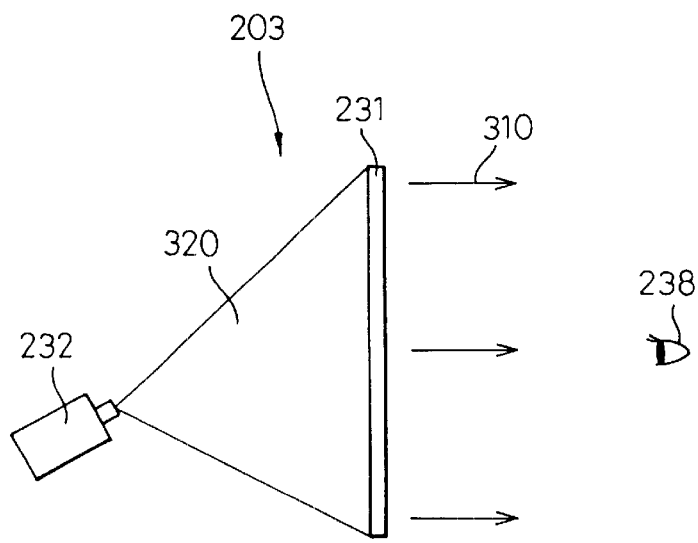
FIG. 14 is a structural diagram of an image display apparatus utilizing a hologram screen comprising a hologram according to Embodiment 4.

A projector 232 was placed in a position relative to the hologram screen 231 as shown in FIG. 14, and an image beam 320 was irradiated from the projector 232, by which the image beam 320 was scattered at the hologram screen 231, displaying an image 310 to a viewer 238 facing the left side of the drawing.

Figure 15A:
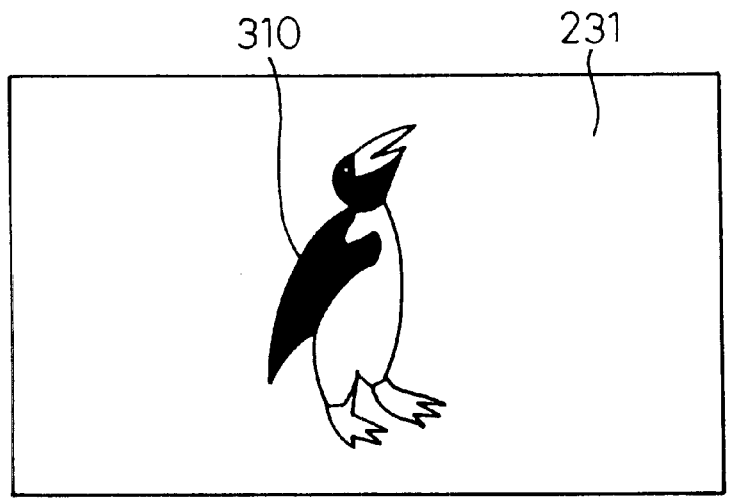
FIG. 15A is a sketch showing the state of a hologram screen according to FIG. 14

The results are shown in FIG. 15A.

The viewer 238 could perceive no string-like or emboss-like blemishes on the hologram screen 231, as shown here.

Thus, the viewer 238 was able to view a clear image 310 with a satisfactory appearance.

According to the production process for this embodiment there is obtained a hologram wherein the protective film 215 used is coated on the surface with a release agent such as silicone, and the bonding strength A between the substrate 211 and the hologram 201 is greater than the bonding strength B between the hologram 201 and the protective film 215.

Figure 16A:
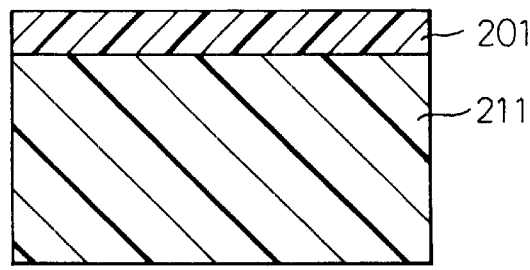
FIGS. 16A, 16B and 16C are cross-sectional views illustrating how deformed sections in a hologram protective film are eliminated by restoring force F, for Embodiment 4.
Figure 16B:
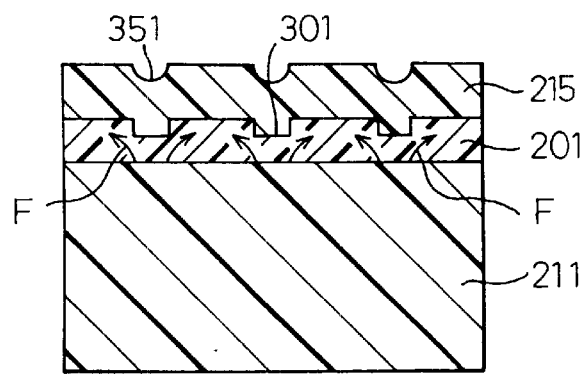

Incidentally, when the protective film 215 is affixed onto the hologram 201 attached to the substrate 211 as shown in FIG. 16A, deformations 301, 351 are formed in the protective film 215 and hologram 201, as shown in FIG. 16B.

In the hologram 201 obtained by the production process for this embodiment, the bonding strength A is higher than the bonding strength B, and therefore the hologram 201 is anchored to the substrate 211. That is, the protective film 215 is in a freer state with respect to the hologram 201.

Figure 16C:
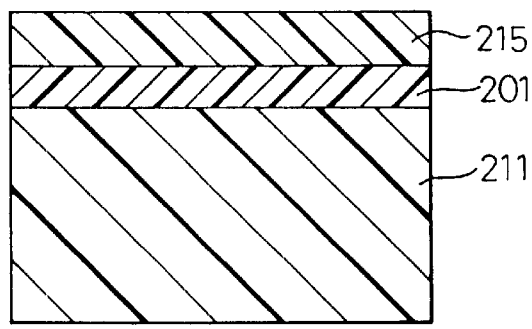

Thus, as shown in FIG. 16B, the deformed sections 301 of the hologram 201 are removed by the restoring force F of the hologram 201, and the deformed sections 351 of the protective film 215 are removed by the restoring force of the protective film 215, resulting in a hologram 201 and protective film 215 with virtually no deformed sections 301, 351, as shown in FIG. 16C.

According to this embodiment, then, it is possible to obtain holograms with minimal appearance defects caused by deformation of the holograms.

Embodiment 5

This embodiment will illustrate a production process for a hologram using the light exposure apparatus shown in FIG. 17.

As shown in FIG. 17, the light exposure apparatus 202 of this embodiment is similar to Embodiment 4 in that a film is set on a supply roller 221 of the light exposure apparatus 22, the film 219 is conveyed from there to the protective material peeling section 223, and the protective material is peeled at the protective material peeling section 223, thus exposing the photopolymer surface.

Also, the photopolymer surface of the film from which the protective material has been peeled is affixed facing the side of the photographed object original 213 at the light exposure section 224.

Next, laser light 220 (Ar laser light of 514 nm wavelength) is irradiated from the side of the photographed object original 213 as shown in the drawing, for laser light exposure. This copies the photographed object original 213 to the photopolymer, so that the photopolymer becomes a hologram. The hologram is then peeled from the photographed object original 213 together with the substrate.

The hologram obtained in this manner is introduced into a ultraviolet irradiation section 241, where the hologram is irradiated with ultraviolet rays using a mercury lamp 410. The ultraviolet irradiation output is about 100 mJ/cm$^2$. The hologram is then introduced into a heating section 242 for heating at 140° C. for 8 minutes using an electric heater 420.

After heating has been completed, the hologram is conveyed to the protective film attachment section 225 where the protective film 215 is affixed, after which it is wound up on the winding roller 227.

This results in a long hologram with the hologram surface protected with a protective film.

The molecular weight distribution in a hologram obtained by the production process described above was measured by liquid chromatography, and the results were used to calculate the polymerization ratio. The polymerization ratio of the hologram was found to be 90%.

The hologram obtained by the production process described above was made into a hologram screen by the same method as Embodiment 4, and the hologram screen was irradiated with an image beam in the same manner as Embodiment 4 to display in image on the screen.

As a result, as shown in FIG. 15A explained above, the hologram screen using the hologram prepared by the production process of this embodiment also exhibited no visible string-like or emboss-like blemishes. A clear image with a good appearance was observable.

In the case of this embodiment, polymerization of the hologram is promoted before attachment of the protective film and the viscosity is lowered, so that the bonding strength B between the hologram and the protective film is lower than the bonding strength A between the hologram and the substrate, making it possible to achieve the same effect as with Embodiment 1.

Also, by increasing the hardness it is possible to minimize deformation of the hologram prior to attachment of the protective film, thus resulting in a hologram with minimal appearance defects.

Embodiment 6

This embodiment will illustrate a production process for a hologram using a tackifier coated on the side on which a protective film is affixed.

Figure 18:
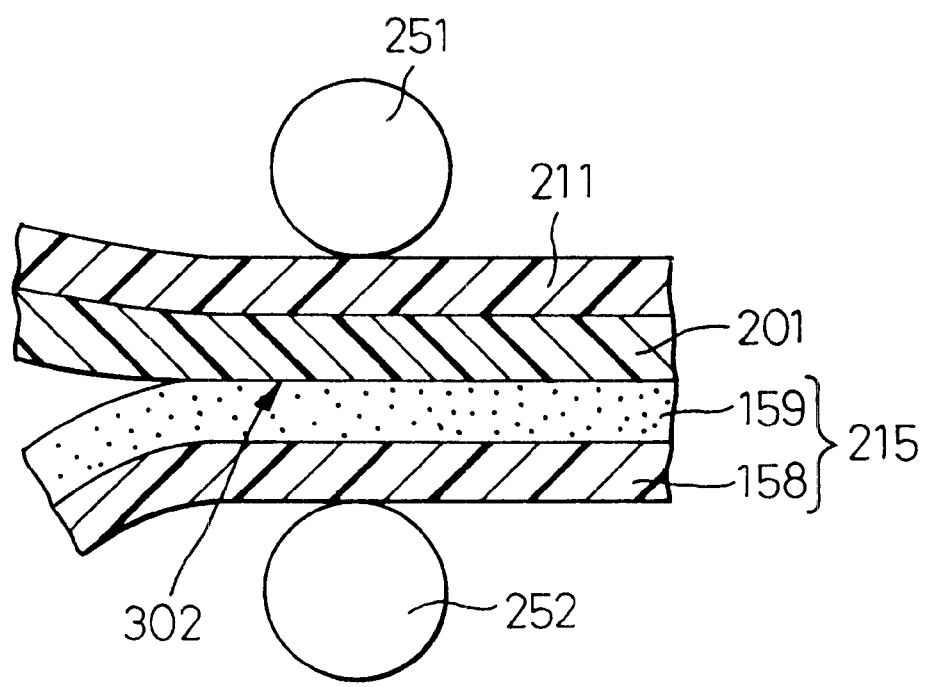
FIG. 18 is a cross-sectional view illustrating a case where a tacky film has been used as a protective film according to Embodiment 6.

The light exposure apparatus of this embodiment is similar to that of Embodiment 4, and this embodiment is characterized in that a tacky film comprising a surface layer 158 and a tackifier 159 as shown in FIG. 18 is used as the protective film 215. The tackifier is an acrylic acid ester, with a thickness of 15 μm.

A hologram obtained by the production process described above was made into a hologram screen by the same method as Embodiment 4, and the hologram screen was irradiated with an image beam in the same manner as Embodiment 4 to display in image on the screen (see FIG. 14 explained above).

As a result, as shown in FIG. 15A explained above, the hologram screen using the hologram prepared by the production process of this embodiment also exhibited no visible string-like or emboss-like blemishes. A clear image with a good appearance was observable.

Embodiment 7

This embodiment will illustrate the relationship between the bonding strength between the protective film and hologram and the condition of appearance defects.

The relationship between the bonding strength and appearance defects was examined by the following test.

For the test, samples were prepared with bonding strengths between the protective film and hologram of 10, 50, 100, 150, 200, 250 and 300 g/50 mm. Ten of each sample were fabricated.

Each hologram was produced by the same process as Embodiment 4, the protective film was made of polyethylene and the surface was release-treated with a silicon-based agent.

The hologram obtained in this manner was used as a screen in the manner shown in FIG. 14 explained above. The condition of the image reflected on the hologram was observed.

The results are shown in Table 1.

TABLE 1

| Bonding strength | Frequency of blemishes (no.) | | Overall |
|---|---|---|---|
| (g/50 mm) | String-like | Emboss-like | evaluation |
| 10 | 0 | 0 | ○ |
| 50 | 0 | 0 | ○ |
| 100 | 0 | 0 | ○ |
| 150 | 2 | 0 | ○ |
| 200 | 9 | 0 | Δ |
| 250 | 10 | 7 | x |
| 300 | 10 | 10 | x |

Figure 15B:
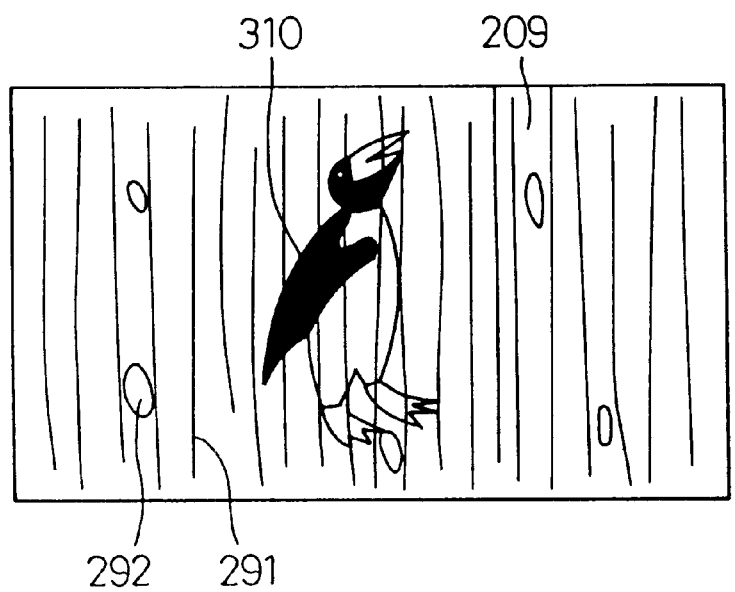
FIG. 15B is a sketch showing the state of a hologram screen in the image display apparatus of FIG. 14 utilizing a hologram according to the prior art, for Embodiment 4.

Incidentally, as shown in FIG. 15B explained above, appearance defects in holograms are basically of two types, string-like blemishes 291 and emboss-like blemishes 292.

When these are compared by reproducing an image 310 on the surface of the hologram screen 231 comprising a hologram with string-like blemishes 291, the linear strings can be seen over the image. The person viewing the image could distinguish the image itself but usually felt that the appearance of the image was not very good.

Impairments of the image 310 due to emboss-like blemishes 292 are displayed as blemishes of significant area over the image. Thus, even a few impairments make it very difficult to see the image.

From this standpoint, Table 1 shows the results of evaluating the states of the images reflected on screens with holograms on which protective films were affixed with various bonding strengths The frequency of blemishes occurring is the number of holograms with string-like blemishes or emboss-like blemishes out of ten holograms.

The overall evaluation was made based on whether or not appearance defects caused loss of the image, rendering some portions unviewable when an image was reflected on the hologram screen.

The same table confirms that neither type of blemish occurred when the bonding strength was 10, 50, or 100 g/50 mm.

It was also found that while string-like blemishes occurred at 150 g/50 mm, the strings were very thin giving an overall evaluation of "o", and allowing observation of the images without problems.

String-like blemishes also occurred at 200 g/50 mm, but the overall evaluation was "Δ", and there was basically no impediment to observation of the images.

Both string-like and emboss-like blemishes occurred at 250 g/50 mm, rendering the images very difficult to view. Both emboss-like and string-like blemishes occurred in all of the holograms at 300 g/50 mm, rending the images very difficult to view. The overall evaluation was "x" in both cases.

It was thus demonstrated that holograms with minimal appearance defects can be obtained by limiting the bonding strength to no greater than 200 g/50 mm.

The following explanation concerns a smoke barrier built to hang from the ceiling of a building, which is suitable for use of a hologram.

A building must be partitioned with smoke barriers for a given floor space, from the standpoint of disaster prevention. A smoke barrier is a barrier provided hanging from the ceiling to temporarily hold back the progression of smoke during a fire. By holding back smoke with the smoke barrier and directing the held smoke out of the building through a furnished exhaust installation, it is possible to delay the time until the building fills with smoke.

Smoke barriers are therefore a very important installation for disaster prevention, and they are hung from ceilings.

Smoke barriers are thus objects that constitute an eyesore and a hindrance from the standpoint of interior and indoor design, while occupying idle space near ceilings and creating a greater "closed-in" spatial feeling for viewers.

Consequently, smoke barriers have been desired which can be installed without impairing room interiors, avoid creating a closed-in feeling, and which can be effectively employed for ordinary uses.

The present invention therefore proposes a smoke barrier characterized by having a screen section to display an image.

Since this smoke barrier ordinarily functions as a screen on which an image is displayed, it can be utilized as a part of a room interior by appropriately selecting the type of image displayed.

Also, by displaying an image presenting meaningful information for persons in the room, it is possible to provide a useful function at ordinary times. The image may be, for example, guide information for the building, or moving or still pictures presenting commercials for related products or services, etc.

Since the smoke barrier can be used as part of the room interior as mentioned above, it creates less of a closed-in feeling for viewers.

It is thereby possible to provide smoke barriers that can be installed without impairing the room interior, that avoid creating a closed-in feeling for viewers, and that can be effectively utilized at ordinary times.

Incidentally, since smoke barriers are installed for the purpose of holding back smoke during fires, they must be constructed of non-flammable materials. Here, "nonflammable" means that under conditions of common fires (that is, fires caused by normal combustion of wood, paper, fiber, etc. in normal buildings), they will not burn, undergo deformation or melt or crack by fire heat, and are fireproof so as not produce harmful smoke or gas.

In order to satisfy these conditions, the smoke barrier is preferably constructed of concrete, firebrick, tile, steel, aluminum, glass, mortar, plaster or the like.

The image displayed on the screen section may be any type of advertisement, publicity, product information, guide information, etc. and is not particularly limited, and since a plurality of smoke barriers will generally be installed for use in halls and the like with considerable floor areas, they can function as a simple information display system to display event information and guide information directly related to the hall.

It is also possible to prepare a series of images to be reflected on individual smoke barriers in a room provided with a plurality of smoke barriers, so that images are displayed in a manner developing a story in tandem with the movement of persons.

A smoke barrier according to the invention may be installed on the ceiling of a hall, conference room, play theater or movie theater, or in different types of corridors, elevators, etc.

The smoke barrier can be of various forms, such as a type which hangs as a suspended wall from a ceiling, or a movable type which ascends or descends with respect to the ceiling depending on the conditions, or a type that rotates 90° to neatly contact with the ceiling. The present invention can be widely applied as a means for effective use of such smoke barriers as display media during ordinary times.

The screen section is preferably constructed so that the image projector can display an image by projection of an image beam.

Since the screen section is also a part of the smoke barrier, the screen section is also preferably nonflammable as described above. It is preferred to at least be flame-retardant so as to produce minimal harmful smoke or gas.

From this standpoint, a projection screen capable of displaying an image by projection of an image beam from an image projector can be used as the screen section, to provide the image projector separate from the smoke barrier, and allow the screen section to have properties of non-flammability or flame retardance.

Liquid crystal panels and screen sections themselves have some sort of electrical mechanism, and screen sections that display images by such mechanisms cannot easily be constructed so as to satisfy the condition of non-flammability, while they are also costly.

The aforementioned projection screen may be, for example, a UMU screen, TET or the like. A hologram screen may also be used, as will be explained below.

The image projector used may be a slide projector, OHP (overhead projector), liquid crystal projector, cinema projector or the like that can irradiate still or motion pictures.

Image data may also be supplied externally to the image projector. In such cases the supply apparatus may be a reproduction apparatus such as a video tape or optical disk, or a data device such as a personal computer linked to the internet.

The screen section preferably has a cloudiness of no greater than 60%.

The screen section of this embodiment has low cloudiness and is transparent. Consequently, the smoke barrier may be constructed of a transparent panel of glass, acrylic or the like and a transparent screen section such as described above may be provided on the transparent smoke barrier to produce a totally transparent smoke barrier.

Since this type of smoke barrier has high light transmittance, it is possible to avoid blocking the field of view by the smoke barrier when the lights in the building fail to work during a fire or when the room is otherwise darkened.

Also, since the presence of the smoke barrier is not conspicuous at ordinary times, it is possible to avoid creating a psychologically closed-in feeling for persons in the room.

Because the image is displayed on a transparent screen section provided on a smoke barrier with such high light transmittance, it is possible to create the appearance of images displayed in empty space to persons in the room.

Thus, since the screen section can attract considerable attention, the smoke barrier can be effectively utilized as a display medium with a high eye-capturing effect.

When the cloudiness is over 60% the smoke barrier becomes non-transparent, rendering it more difficult to achieve the aforementioned effects.

The cloudiness is the value measured based on the haze standard of "Plastic Optical Property Test Method" JIS K7105 (1981 edition). The test piece used for measurement of the cloudiness according to this standard is 80 mm×80 mm.

The screen section preferably consists of a hologram screen.

This will provide the screen section with transparency and thus make it possible to obtain a smoke barrier that will minimize the closed-in effect on persons viewing it.

The hologram screen used may be one constructed with a hologram element affixed to some other object, or constructed with multiple elements laid together, such as explained below.

The hologram screen is preferably constructed with a hologram element affixed onto a transparent member composed of a non-flammable material.

This will make it possible to achieve a display effect with guaranteed transparency.

The hologram element mentioned here can be obtained by providing an object beam, which is scattered light obtained from a light diffuser such as frosted glass and a reference beam, which is non-scattered light, and irradiating both onto a photosensitive material such as photopolymer or the like, to form an interference pattern functioning as a diffraction grating on the photosensitive material.

The transparent material used may be a glass panel, heat-resistant glass panel or the like.

The hologram element and the transparent member are preferably affixed together with a flame-retardant adhesive or tackifier.

This will allow more reliable expression of the flame retardance of the smoke barrier.

The flame-retardant adhesive used may be one composed mainly of an epoxy-based, phenol-based, chloroprene rubber-based, silicon-based, fluorine-based, polyimide-based or polybenzimidazole-based flame-retardant resin.

There may also be used an adhesive prepared by adding, for example, a bromine-based, phosphorus-based, chlorine-based, nitrogen-based organic type or an aluminum-based, antimony-based, magnesium-based, boron-based, zirconium-based or molybdenum-based inorganic type of flame retardant material, which is compatible with the main flammable adhesive and is non-toxic, to any other desired acrylic-based, cellulose-based, styrene rubber-based, nitrile rubber-based, polyester-based, polyurethane-based, polyamide-based or vinyl acetate-based flammable adhesive.

The hologram screen is preferably provided with either or both anti-reflection means and polarizing means on either or both the front and back sides.

This type of screen gives higher contrast to images reflected on the screen section and can therefore exhibit an improved appearance with clearer display of images.

The hologram screen is preferred to be either a transmission type or reflection type. That is, according to the invention either a transmission type or reflection type of hologram screen may be used.

A transmission type comprises a hologram element fabricated by directing an object beam and reference beam from the same side onto the aforementioned photosensitive material. It has a construction such that an image beam is irradiated from the opposite side of the hologram screen from the person viewing the hologram screen.

Unlike a transmission type, a reflection type comprises a hologram element fabricated by irradiating an object beam and a reference beam from the opposite side of a photosensitive material. It has a construction wherein the image beam is also irradiated from the same side as the person.

Multiple smoke barriers are preferably installed on the ceiling along pathways and in the direction of procession along pathways.

This allows new smoke barriers to appear, and images to be displayed on the screen sections of the smoke barriers, as people proceed along pathways.

It thus becomes possible to obtain an effect that attracts people, which is difficult to obtain from an image reflected on a single smoke barrier, and to thus obtain an interior effect which is appealing to viewers.

In particular, when each smoke barrier is transparent and the screen section is constructed of a hologram screen, persons can see through the smoke barrier to the smoke barrier beyond in the direction of procession from the current smoke barrier.

Consequently, when persons view a smoke barrier according to this embodiment in a pathway, the semi-transparent image reflected on the hologram screen is seen to overlap, and this can give a very fascinating appearance for a considerable eye-catching effect.

The smoke barrier described above will now be explained in detail with reference to the drawings.

Smoke Barrier Embodiment 1

An embodiment of the smoke barrier described above will now be explained with reference to FIGS. 19 to 21.

As shown in FIG. 19, the smoke barrier 701 of this embodiment has a screen section 711 for display of an image. As shown in FIG. 20, the screen section 711 is constructed so as to be able to display an image 821 when an image beam 820 is projected using an image projector 712. The screen section 711 comprises a transmission-type hologram screen.

As shown in FIG. 19, the smoke barrier 701 of this embodiment which is composed of a transparent glass panel is constructed as a suspended wall hanging from the ceiling 721 of a room 702. A screen section 711 comprising a hologram screen is affixed on one side of the smoke barrier 701 with a transparent adhesive.

Figure 20:
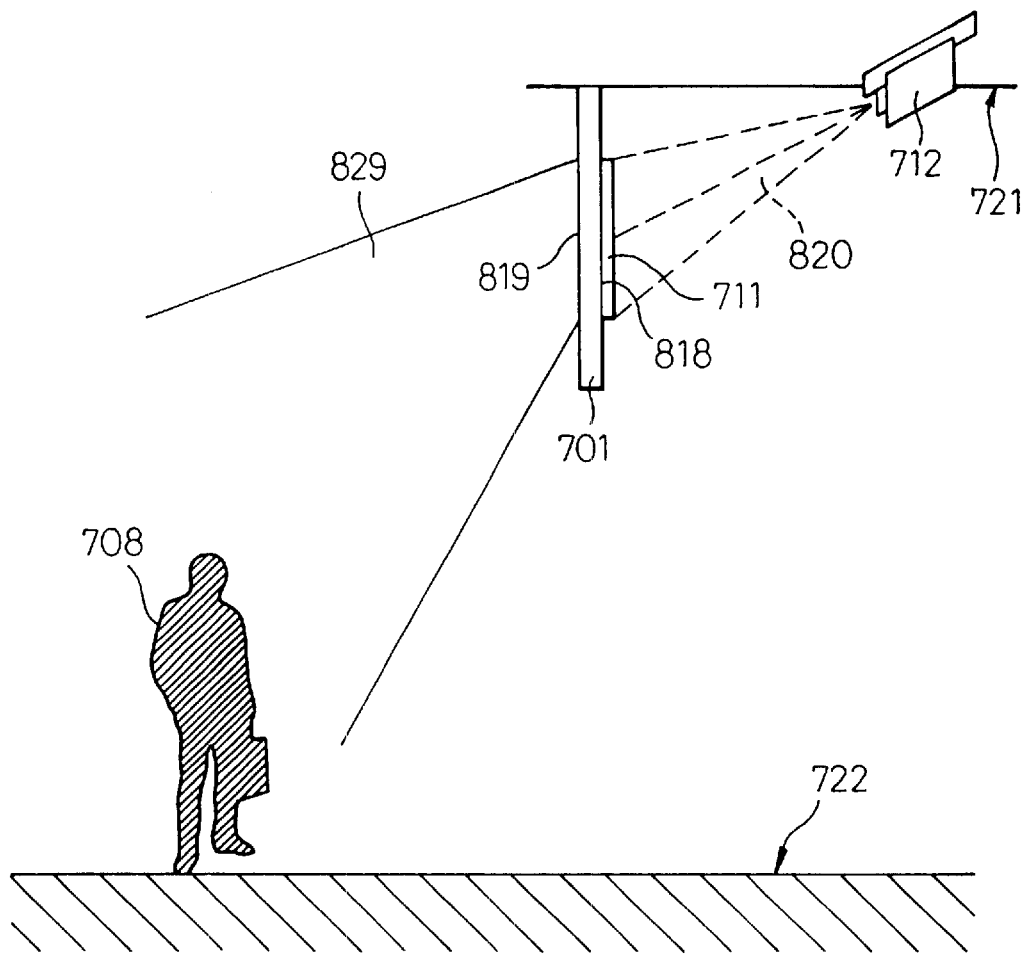
FIG. 20 is a side view of a smoke barrier also based on the Smoke Barrier Embodiment 1.

As shown in FIG. 20, an image projector 712 which projects an image beam 820 on the screen section 711 is a liquid crystal projector, and the image projector 712 is installed so that the image 821 reflected by this projection can be observed by a person 708 standing on the floor 722 of the room 702.

In other words, the hologram screen normally has a field angle, and it is difficult to see the image reflected on the hologram screen outside of the range of the field angle.

However, when the smoke barrier 701 of this embodiment is installed, the positional relationship between the screen section 711 and the image projector 712 is arranged in advance so that the person's head (eye level) is positioned within the field angle 829.

An image providing apparatus, not shown, is also connected to the image projector 712, and this apparatus sends image data on which the image beam 821 is based. The image providing apparatus used may be an LD player, video, video CD or the like.

An exhaust installation, not shown, is also provided with the smoke barrier 701, in a construction such that in the event of a fire, smoke is held back by the smoke barrier and the smoke is directed out of the room by the exhaust installation. This will delay the time until the room fills with smoke.

Figure 21:
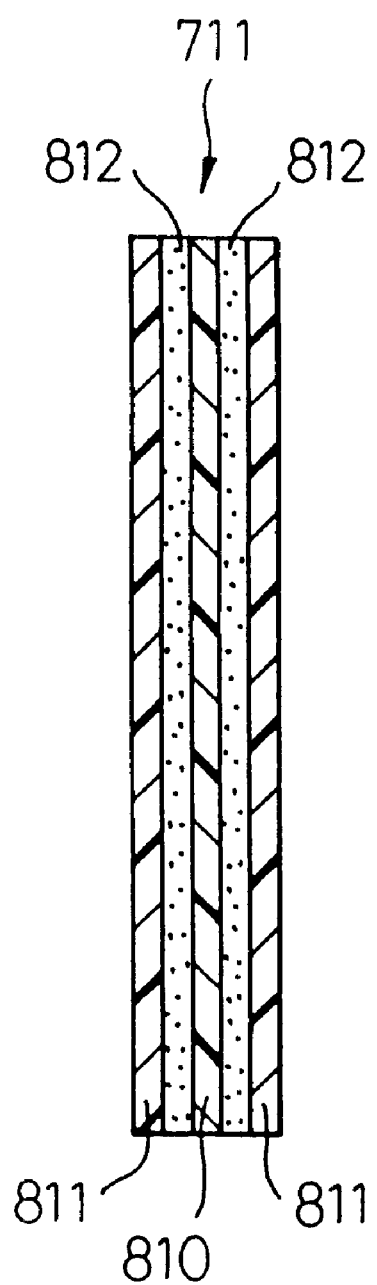
FIG. 21 is an cross-sectional view of a hologram screen constituting a screen section according to the Smoke Barrier Embodiment 1.

As shown in FIG. 21, the hologram screen 711 comprises a hologram element 810 and glass panels 811 affixed onto the front and back sides thereof using a flame retardant adhesive 812.

The hologram element 810 is fabricated by irradiating a photosensitive member with scattered light (light obtained by light diffusion from frosted glass or the like) and non-scattered light from the same side in an exposure optical system, to record onto the photosensitive member the interference pattern obtained by their interference. Because the interference pattern functions as a diffraction grating, an image is displayed on the hologram screen.

A photopolymer is used as the photosensitive member, and an epoxy-based, silicon-based material or the like is used as the adhesive.

The smoke barrier 701 of this embodiment will now be explained in regard to the mechanism by which the image 821 is displayed.

Image data is supplied from the image supply apparatus to the image projector 712, and an image beam 820 is irradiated from the image projector 712 to the screen section 711 comprising the hologram screen.

Thus, as shown in FIG. 20, the image beam 820 is diffracted at the screen section 711 comprising the hologram screen, to produce diffracted light. Since the diffracted light passes through the transparent smoke barrier 701, a person 708 can observe the image 821 reflected onto the screen section 711, from the opposite side 819 from the side 818 on which the screen section 711 is affixed.

The smoke barrier 701 of this embodiment functions as a screen displaying the image 821 during normal times, and it can therefore be used as a part of the room interior by appropriately selecting the type of image 821 displayed.

By displaying the image 821 bearing meaningful information to the person 708 who can view the smoke barrier 701 in the room 702, it is possible to provide a useful function at normal times.

Since the smoke barrier 701 serves as a part of the interior of the room 702 as explained above, it minimizes any closed-in feelings felt by viewers.

According to this embodiment it is possible to provide a smoke barrier which can be installed without spoiling the room interior, and which avoids creating a closed-in feeling for viewers and can be effectively utilized during normal times.

The screen section 711 of this embodiment can also be constructed of a reflection-type hologram screen. It will thereby become possible to view an image reflected onto the screen when a person stands facing the side of the smoke barrier on which the screen section is formed. In this case, the smoke barrier 701 may be nontransparent.

Smoke Barrier Embodiment 2

This embodiment is a case where multiple smoke barriers are provided on a ceiling along a pathway where a moving sidewalk is installed.

As shown in FIG. 22, there is a pathway 729 with a moving sidewalk 723 installed, and transparent smoke barriers 801, 802, 803 are installed at regular spacings on the ceiling 721 along the pathway 729.

As shown in FIGS. 19 to 21 explained above, the smoke barrier 701 has a screen section 711 comprising a hologram screen, which is affixed on one side of each smoke barrier 801, 802, 803. The screen section 711 is constructed so as to display an image 821 by projection of an image beam 820 using an image projector 712.

A person riding on the moving sidewalk 723 changes position along with the moving sidewalk 723 to the points indicated at 781, 782 and 783. The person positioned at point 781 can see the screen section 711 installed on the smoke barrier 801 and the image reflected thereon. Since the smoke barrier 801 is transparent, it is possible to see the image reflected on the screen section of the smoke barriers 802, 803, etc. through this smoke barrier 801.

Thereafter, the person moves with the moving sidewalk through position 782 to reach position 783. This movement allows a different smoke barrier to be seen, thus also allowing a different image to be seen.

The smoke barriers 801, 802, 803 themselves and the screen section 701 are otherwise identical to those of the smoke barrier Embodiment 1.

The multiple smoke barriers 801, 802, 803 of this embodiment are installed along the pathway 729 provided with the moving sidewalk 723.

Thus, as a person riding on the moving sidewalk 723 proceeds along the pathway 729 through position 781, position 782 and position 783, new smoke barriers appear one after another. Images are displayed on the screen section 711 of each smoke barrier.

It is thereby possible to obtain an eye-catching effect which is difficult to achieve with an image reflected on a single smoke barrier, so that an interior effect can be obtained is appealing to viewers.

In particular, since this embodiment has transparent smoke barriers 801, 802, 803 and the screen section 711 is constructed of a transmission-type hologram screen, a person is able to see through the nearer smoke barrier to the smoke barrier beyond in the direction of procession from the current smoke barrier.

Consequently, when a person views the smoke barriers 801, 802, 803 of this embodiment along the pathway 729, the semi-transparent image reflected on the hologram screen is seen overlapping, and this can give a very fascinating appearance. According to this embodiment, therefore, it is possible to achieve a considerable eye-catching effect, so that the barriers can be utilized as a new display medium during normal times.

The invention of the smoke barrier described above and its modes are summarized below.

1. A smoke barrier characterized by having a screen section for display of an image.

2. A smoke barrier according to 1., characterized in that the screen section is constructed so as to be able to display an image by projection of an image beam using an image projector.

3. A smoke barrier according to 1. or 2., characterized in that the screen section has a cloudiness of no greater than 60%.

4. A smoke barrier according to any one of 1. to 3., characterized in that the screen section comprises a hologram screen.

5. A smoke barrier according to 4., characterized in that the hologram screen has a construction wherein a hologram element is affixed to a transparent member made of a non-flammable material.

6. A smoke barrier according to 5., characterized in that the hologram element and the transparent member are affixed together with a flame retardant adhesive agent or tackifier.

7. A smoke barrier according to any one of 4. to 6., characterized in that the hologram screen is provided with either or both anti-reflection means and polarizing means on either or both the front and back sides.

8. A smoke barrier according to any one of 4. to 7., characterized in that the hologram screen is either a transmission type or reflection type.

9. A smoke barrier according to any one of 1. to 8., characterized in that multiple smoke barriers are installed on the ceiling along a pathway and in the direction of procession along the pathway.

What is claimed is:

1. A hologram comprising a hologram film in which a diffraction grating has been recorded, a substrate situated on one side of said hologram film via a bonding material, and a polymer film situated on the other side of said hologram film via a bonding material, characterized in that the thickness of said polymer film is no greater than 100 μm and that said hologram is a hologram screen that displays an image by diffraction and scattering of irradiated light comprising image data.

2. A hologram according to claim 1, characterized in that said polymer film has a polarizing optical property.

3. A hologram comprising a hologram film in which a diffraction grating has been recorded, a substrate situated on one side of said hologram film via a bonding material, and a polymer film situated on the other side of said hologram film via a bonding material, characterized in that the thickness of said polymer film is no greater than 100 μm and that said hologram is a hologram reflector element that displays a virtual image by reflecting image data irradiated as an irradiated beam.

4. A hologram comprising a hologram film in which a diffraction grating has been recorded, a first polymer film situated on one side of said hologram film via a bonding material, a substrate situated via a bonding material on the side of said first polymer film on which the hologram film is not situated, and a second polymer film situated on the other side of said hologram film via a bonding material, characterized in that the thickness of said first polymer film is no greater than 150 μm and that said hologram is a hologram screen that displays an image by diffraction and scattering of irradiated light comprising image data.

5. A hologram according to claim 4, characterized in that said polymer film has a polarizing optical property.

6. A hologram comprising a hologram film in which a diffraction grating has been recorded, a first polymer film situated on one side of said hologram film via a bonding material, a substrate situated via a bonding material on the side of said first polymer film on which the hologram film is not situated, and a second polymer film situated on the other side of said hologram film via a bonding material, characterized in that the thickness of said first polymer film is no greater than 150 μm and that said hologram is a hologram reflector element that displays a virtual image by reflecting image data irradiated as an irradiated beam.

7. A hologram comprising a hologram film in which a diffraction grating has been recorded, a substrate situated on one side of said hologram film via a bonding material, and a polymer film situated on the other side of said hologram film via a bonding material, characterized in that said polymer film has been subjected to prior heat treatment.

8. A hologram according to claim 7, characterized in that said polymer film has a polarizing optical property.

9. A hologram according to claim 7, characterized in that said hologram is a hologram screen that displays an image by diffraction and scattering of irradiated light comprising image data.

10. A hologram according to claim 7, characterized in that said hologram is a hologram reflector element that displays a virtual image by reflecting image data irradiated as an irradiated beam.

11. A hologram comprising a hologram film in which a diffraction grating has been recorded, a first polymer film situated on one side of said hologram film via a bonding material, a substrate situated via a bonding material on the side of said first polymer film on which the hologram film is not situated, and a second polymer film situated on the other side of said hologram film via a bonding material, characterized in that said first polymer film has been subjected to prior heat treatment.

12. A hologram according to claim 11, characterized in that said polymer film has a polarizing optical property.

13. A hologram according to claim 11, characterized in that said hologram is a hologram screen that displays an image by diffraction and scattering of irradiated light comprising image data.

14. A hologram according to claim 11, characterized in that said hologram is a hologram reflector element that displays a virtual image by reflecting image data irradiated as an irradiated beam.

15. A smoke barrier characterized by having a hologram screen section for display of an image, which hologram screen section comprises the hologram according to claim 1.

16. A hologram according to claim 3, characterized in that said polymer film has a polarizing optical property.

17. A smoke barrier characterized by having a hologram screen section for display of an image, which hologram screen section comprises the hologram according to claim 3.

18. A smoke barrier characterized by having a hologram screen section for display of an image, which hologram screen section comprises the hologram according to claim 4.

19. A hologram according to claim 6, characterized in that said polymer film has a polarizing optical property.

20. A smoke barrier characterized by having a hologram screen section for display of an image, which hologram screen section comprises the hologram according to claim 6.

* * * * *